US009350498B2

(12) United States Patent
Nammi et al.

(10) Patent No.: US 9,350,498 B2
(45) Date of Patent: May 24, 2016

(54) ENCODING HYBRID AUTOMATIC REPEAT REQUEST ACKNOWLEDGEMENTS IN A MULTI-ANTENNA WIRELESS COMMUNICATIONS SYSTEM

(71) Applicant: Telefonaktiebolaget L M Ericsson (publ), Stockholm (SE)

(72) Inventors: Sairamesh Nammi, Kista (SE); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/431,808

(22) PCT Filed: May 30, 2013

(86) PCT No.: PCT/SE2013/050624
§ 371 (c)(1),
(2) Date: Mar. 27, 2015

(87) PCT Pub. No.: WO2014/051491
PCT Pub. Date: Apr. 3, 2014

(65) Prior Publication Data
US 2015/0256298 A1    Sep. 10, 2015

Related U.S. Application Data

(60) Provisional application No. 61/706,845, filed on Sep. 28, 2012.

(51) Int. Cl.
*H04K 1/10* (2006.01)
*H04L 1/18* (2006.01)
(Continued)

(52) U.S. Cl.
CPC ............ *H04L 1/1893* (2013.01); *H04B 7/0478* (2013.01); *H04L 1/1621* (2013.01)

(58) Field of Classification Search
CPC ... H04L 5/0055; H04L 1/1812; H04L 1/1896; H04L 1/1822; H04L 1/06; H04L 1/18; H04L 1/0031; H04L 1/1858; H04L 1/1864; H04L 2025/03426; H04L 25/03343; H04B 7/0413; H04B 7/04; H04B 7/0689
USPC .................. 375/267, 260, 347, 299, 101, 500; 714/748, 749; 455/101, 500
See application file for complete search history.

(56) References Cited

U.S. PATENT DOCUMENTS

2013/0195008 A1* 8/2013 Pelletier ............... H04B 7/0417
370/328

OTHER PUBLICATIONS

3GPP, "3rd Generation Partnership Project; Technical Specification Group Radio Access Network; Multiplexing and channel coding (FDD) (Release 11)", 3GPP TS 25.212 V11.3.0, Sep. 2012, 1-135.
(Continued)

*Primary Examiner* — Rahel Guarino
(74) *Attorney, Agent, or Firm* — Murphy, Bilak & Homiller, PLLC

(57) ABSTRACT

There is provided a method performed by a User Equipment, UE, for encoding Hybrid Automatic Repeat Request, HARQ, Acknowledgements, ACK/NACK, in a multi-antenna wireless communications system. The method comprises the step (S1) of bundling, also referred to as co-representing, a HARQ-ACK/NACK to be sent in response for a transport block of information with a HARQ-ACK/NACK to be sent in response for another transport block of information, when more than two transport blocks of information are used. The method also comprises the step (S2) of encoding the bundled HARQ-ACK/NACK information.

23 Claims, 11 Drawing Sheets

(51) Int. Cl.
*H04L 1/16* (2006.01)
*H04B 7/04* (2006.01)

(56) References Cited

OTHER PUBLICATIONS

3GPP, "3rd Generation Partnership Project; Technical Specification Group Radio Access Network; Multiplexing and channel coding (FDD) (Release 9)", 3GPP TS 25.212 V9.5.0, Mar. 2012, 1-107.
Unknown, Author, "3rd Generation Partnership Project; Technical Specification Group Radio Access Network; Physical layer procedures (FDD) (Release 9)", 3GPP TS 25.214 V9.3.0, Sep. 2010, 1-98.
Unknown, Author, "4-branch MIMO for HSDPA", Ericsson, 3GPP TSG RAN WG1 Meeting #65, R1-111763, Barcelona, Spain, May 9-13, 2011, 1-17.
Unknown, Author, "Feedback Channel Design for Four branch MIMO System", 3GPP TSG RAN WG1 Meeting #68, R1-120361, Ericsson, Dresden, Germany, Feb. 6-10, 2012, 1-7.
Unknown, Author, "Layer Mapping for Four branch MIMO System", 3GPP TSG-RAN WG1 #69, R1-122813, Ericsson, Prague, Czech Republic, May 21-25, 2012, 1-6.
Unknown, Author, "UL-Feedback Channel Design for Four branch MIMO System with Single Carrier", 3GPP TSG-RAN WG1 #70, R1-123757, Ericsson, Qingdao, P.R. of China, Aug. 13-17, 2012, 1-10.

\* cited by examiner

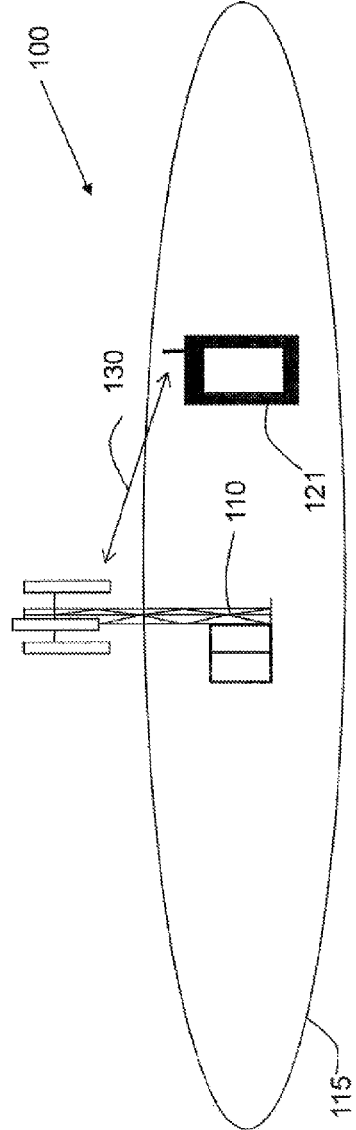
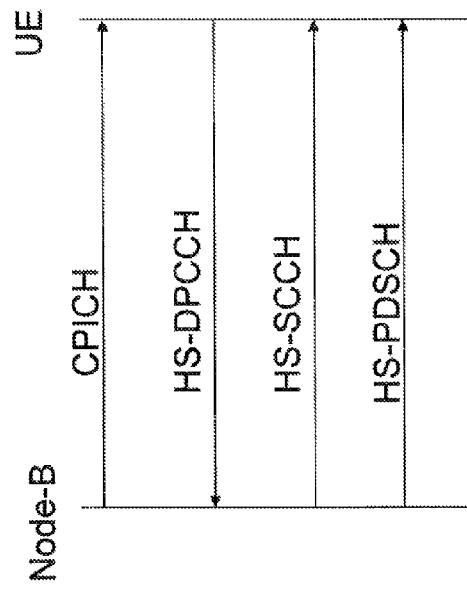

| HARQ ACK | CQI | PCI | HARQ ACK | CQI | PCI | HARQ ACK | CQI | PCI |

Fig. 3

| HARQ-ACK message to be transmitted | | | W₀ | W₁ | W₂ | W₃ | W₄ | W₅ | W₆ | W₇ | W₈ | W₉ |
|---|---|---|---|---|---|---|---|---|---|---|---|---|
| HARQ-ACK in response to a single scheduled transport block | | | | | | | | | | | | |
| ACK | | | 1 | 1 | 1 | 1 | 1 | 1 | 1 | 1 | 1 | 1 |
| NACK | | | 0 | 0 | 0 | 0 | 0 | 0 | 0 | 0 | 0 | 0 |
| HARQ-ACK in response to two scheduled transport blocks | | | | | | | | | | | | |
| Response to primary transport block | Response to secondary transport block | | | | | | | | | | | | |
| ACK | ACK | | 1 | 0 | 1 | 0 | 1 | 1 | 1 | 1 | 0 | 1 |
| ACK | NACK | | 1 | 1 | 0 | 1 | 0 | 1 | 0 | 1 | 1 | 1 |
| NACK | ACK | | 0 | 1 | 1 | 1 | 1 | 0 | 1 | 0 | 1 | 1 |
| NACK | NACK | | 1 | 0 | 0 | 0 | 1 | 0 | 1 | 0 | 0 | 0 |
| PRE/POST indication | | | | | | | | | | | | |
| PRE | | | 0 | 0 | 1 | 0 | 0 | 1 | 0 | 0 | 1 | 0 |
| POST | | | 0 | 1 | 0 | 1 | 0 | 0 | 0 | 1 | 0 | 0 |

Fig. 4

| HARQ-ACK message to be transmitted | | | $W_0$ | $W_1$ | $W_2$ | $W_3$ | $W_4$ | $W_5$ | $W_6$ | $W_7$ | $W_8$ | $W_9$ |
|---|---|---|---|---|---|---|---|---|---|---|---|---|
| HARQ-ACK in response to a single scheduled transport block | | | | | | | | | | | | |
| ACK | | | 1 | 1 | 1 | 1 | 1 | 1 | 1 | 1 | 1 | 1 |
| NACK | | | 0 | 0 | 0 | 0 | 0 | 0 | 0 | 0 | 0 | 0 |
| HARQ-ACK in response to two scheduled transport blocks | | | | | | | | | | | | |
| Response to primary transport block | Response to secondary transport block | | | | | | | | | | | |
| ACK | ACK | | 1 | 0 | 1 | 0 | 1 | 1 | 1 | 1 | 0 | 1 |
| ACK | NACK | | 1 | 1 | 0 | 1 | 0 | 1 | 0 | 1 | 1 | 1 |
| NACK | ACK | | 0 | 1 | 1 | 1 | 1 | 0 | 1 | 0 | 1 | 1 |
| NACK | NACK | | 1 | 0 | 0 | 1 | 0 | 0 | 1 | 0 | 0 | 0 |
| HARQ-ACK in response to three scheduled transport blocks | | | | | | | | | | | | |
| Response to primary transport block | Response to secondary transport block | Response to third transport block | | | | | | | | | | |
| ACK | ACK | ACK | 1 | 0 | 1 | 0 | 1 | 1 | 1 | 1 | 0 | 1 |
| ACK | NACK | ACK | 1 | 1 | 0 | 1 | 0 | 1 | 0 | 1 | 1 | 1 |
| NACK | ACK | ACK | 0 | 1 | 1 | 1 | 1 | 0 | 1 | 0 | 1 | 1 |
| NACK | NACK | ACK | 1 | 0 | 0 | 1 | 0 | 0 | 1 | 0 | 0 | 0 |
| ACK | ACK | NACK | 1 | 1 | 0 | 1 | 0 | 1 | 0 | 1 | 1 | 1 |
| ACK | NACK | NACK | 1 | 1 | 0 | 1 | 0 | 1 | 0 | 1 | 1 | 1 |
| NACK | ACK | NACK | 1 | 0 | 0 | 1 | 0 | 0 | 1 | 0 | 0 | 0 |
| NACK | NACK | NACK | 1 | 0 | 0 | 1 | 0 | 0 | 1 | 0 | 0 | 0 |

Fig. 10

| HARQ-ACK message to be transmitted | | | | $W_0$ | $W_1$ | $W_2$ | $W_3$ | $W_4$ | $W_5$ | $W_6$ | $W_7$ | $W_8$ | $W_9$ |
|---|---|---|---|---|---|---|---|---|---|---|---|---|---|
| HARQ-ACK in response to four scheduled transport blocks | | | | | | | | | | | | | |
| Response to primary transport block | Response to secondary transport block | Response to third transport block | Response to fourth transport block | | | | | | | | | | |
| ACK | ACK | ACK | ACK | 1 | 0 | 1 | 0 | 1 | 1 | 1 | 1 | 0 | 1 |
| ACK | NACK | ACK | ACK | 1 | 1 | 0 | 1 | 0 | 1 | 0 | 1 | 1 | 1 |
| NACK | ACK | ACK | ACK | 0 | 1 | 1 | 1 | 1 | 0 | 1 | 0 | 1 | 1 |
| NACK | NACK | ACK | ACK | 1 | 0 | 0 | 1 | 0 | 0 | 1 | 0 | 0 | 0 |
| ACK | ACK | NACK | ACK | 1 | 1 | 0 | 1 | 0 | 1 | 0 | 1 | 1 | 1 |
| ACK | NACK | NACK | ACK | 1 | 1 | 0 | 1 | 0 | 1 | 0 | 1 | 1 | 1 |
| NACK | ACK | NACK | ACK | 1 | 0 | 0 | 1 | 0 | 0 | 1 | 0 | 0 | 0 |
| NACK | NACK | NACK | ACK | 1 | 0 | 0 | 1 | 0 | 0 | 1 | 0 | 0 | 0 |
| ACK | ACK | ACK | NACK | 0 | 1 | 1 | 1 | 1 | 0 | 1 | 0 | 1 | 1 |
| ACK | NACK | ACK | NACK | 1 | 0 | 0 | 1 | 0 | 0 | 1 | 0 | 0 | 0 |
| NACK | ACK | ACK | NACK | 0 | 1 | 1 | 1 | 1 | 0 | 1 | 0 | 1 | 1 |
| NACK | NACK | ACK | NACK | 1 | 0 | 0 | 1 | 0 | 0 | 1 | 0 | 0 | 0 |
| ACK | ACK | NACK | NACK | 1 | 0 | 0 | 1 | 0 | 0 | 1 | 0 | 0 | 0 |
| ACK | NACK | NACK | NACK | 1 | 0 | 0 | 1 | 0 | 0 | 1 | 0 | 0 | 0 |
| NACK | ACK | NACK | NACK | 1 | 0 | 0 | 1 | 0 | 0 | 1 | 0 | 0 | 0 |
| NACK | NACK | NACK | NACK | 1 | 0 | 0 | 1 | 0 | 0 | 1 | 0 | 0 | 0 |
| PRE/POST indication | | | | | | | | | | | | | |
| PRE | | | | 0 | 0 | 1 | 0 | 0 | 1 | 0 | 0 | 1 | 0 |
| POST | | | | 0 | 1 | 0 | 0 | 1 | 0 | 0 | 1 | 0 | 0 |

Fig. 11

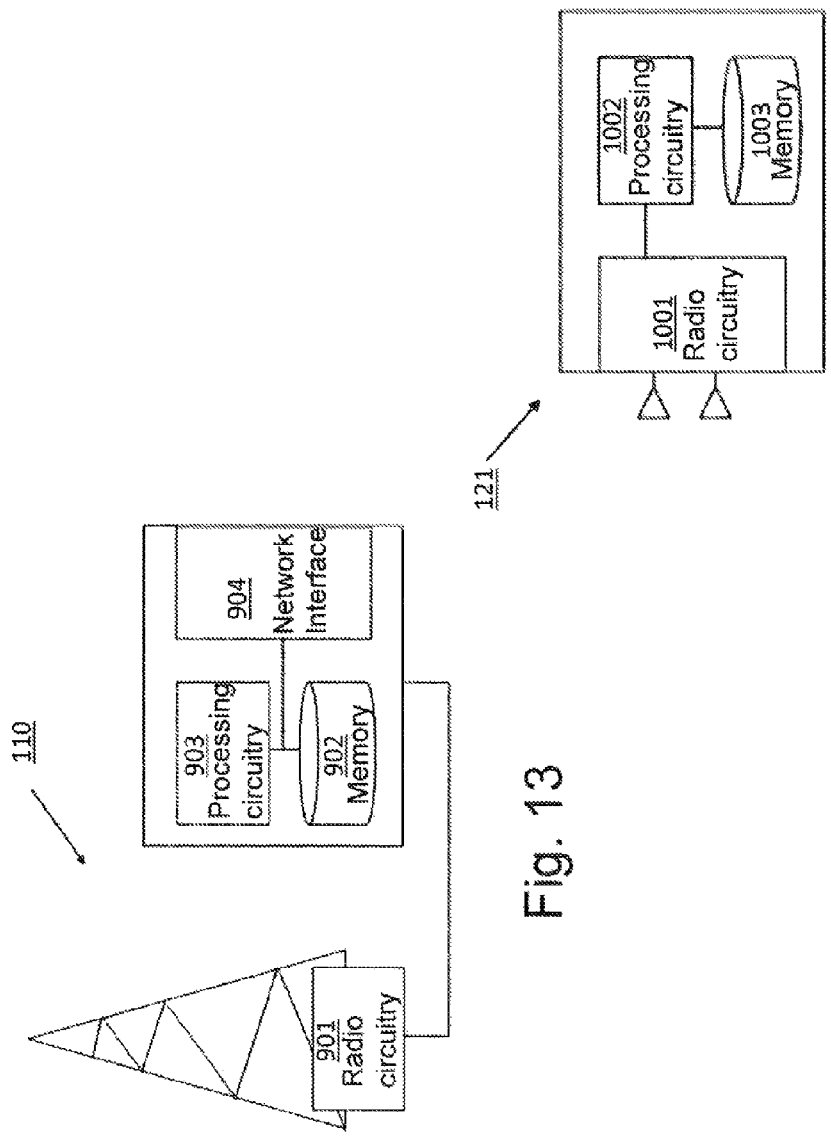

ENCODING HYBRID AUTOMATIC REPEAT REQUEST ACKNOWLEDGEMENTS IN A MULTI-ANTENNA WIRELESS COMMUNICATIONS SYSTEM

TECHNICAL FIELD

Embodiments herein relate to a network node, a user equipment and methods therein. In particular, embodiments herein relate to encoding hybrid Automatic Repeat ReQuest (HARQ) Acknowledgements (ACK/NACK) in a multi-antenna wireless communications system.

BACKGROUND

Several new features are added for the long term High Speed Packet Access (HSPA) evolution in order to meet the requirements set by the International Mobile Telecommunications Advanced (IMT-A). The main objective of these new features is to increase the average spectral efficiency. One possible technique for improving downlink spectral efficiency would be to introduce support for four branch multiple-input multiple-output (MIMO), i.e. utilize up to four transmit and receive antennas to enhance the spatial multiplexing gains and to offer improved beamforming capabilities. Using four branch MIMO currently provides up to 84 Mbps per 5 MHz carrier for high signal-to-noise ratio (SNR) users and improves the coverage for low SNR users.

The current High Speed Downlink Packet Access (HSDPA) system (Release 7-10) supports up to two (2) branch MIMO, i.e. supports up to two (2) transmit antennas at the network node. For these HSDPA systems, from channel sounding, a user equipment (UE) measures the channel and reports the channel state information (CSI) in one sub-frame. Typically, this report comprises a channel quality indicator (CQI) which explicitly indicates a Rank Indicator (RI) and a Precoding Control Indicator (PCI). The UE sends this report periodically for every subframe, i.e. for every Time Transmission Interval (TTI). The reporting here uses the MIMO codebook for 1-2 transmit antennas according to Release 7 MIMO. Once the network node receives this report, the network node grants the modulation and coding, the number of codes, the rank and the precoding channel indicator to each specific UE based on the scheduler metric.

However, with the introduction of four (4) branch MIMO in a HSPDA system, i.e. up to four (4) transmit antennas at the network node, a new feedback channel structure to send the CQI/PCI information to the network node from the UE is required. This is because in a four (4) branch MIMO system using two codewords, there is up to 4 transport blocks of information that may be processed simultaneously. This also means that there will be up to 4 ACK/NACK in the HARQ signalling, since each transport block is decoded and CRC (Cyclic Redundancy Check) check is applied at the network node.

Since this information is to be represented in the first slot in a sub-frame of the uplink signalling channel, i.e. the High Speed Dedicated Physical Control CHannel (HS-DPCCH), a MIMO codebook for the four (4) branch MIMO is needed to represent the ACK/NACK information in the HARQ signalling.

Reference [1] discusses the possibility to introduce larger transport block sizes so that there would be two transport blocks within a new larger transport block, and use the Rel-7 HARQ-ACK codebook.

Reference [2] also briefly mentions the possibility to re-use the Rel-7 HARQ-ACK codebook for 2 codeword, 2 HARQ processes in the HARQ design for a four branch MIMO system; but without mentioning how this should be done.

There is thus a general need for an efficient way of encoding Hybrid Automatic Repeat Request, HARQ, Acknowledgements, ACK/NACK, in a multi-antenna wireless communications system. This will for example be useful in MIMO systems and similar communications systems.

SUMMARY

It is an object of embodiments herein to provide efficient encoding of HARQ-ACK/NACK information and maintain high system performance in a multi-antenna wireless communications system.

According to a first aspect there is provided a method performed by a User Equipment, UE, for encoding Hybrid Automatic Repeat Request, HARQ, Acknowledgements, ACK/NACK, in a multi-antenna wireless communications system. The method comprises the steps of:
  bundling, also referred to as co-representing, a HARQ-ACK/NACK to be sent in response for a transport block of information with a HARQ-ACK/NACK to be sent in response for another transport block of information, when more than two transport blocks of information are used; and
  encoding the bundled HARQ-ACK/NACK information.

In this way, it is possible to efficiently represent HARQ-ACK/NACK information even for a rank higher than two, i.e. when HARQ-ACK/NACK information for more than two simultaneous streams are encoded.

According to a second aspect there is provided a method performed by a User Equipment, UE, for encoding Hybrid Automatic Repeat Request, HARQ, Acknowledgements, ACK/NACK, for a High Speed Dedicated Physical Control Channel, HS-DPCCH, in a multi-antenna wireless communications system. The UE is configured in Multiple Input Multiple Output, MIMO, mode with four transmits antennas or more, and the method comprises the steps of:
  when three or four transport blocks are used:
    co-representing an ACK for the second transport block and an ACK for the third transport block as an ACK; and
    co-representing the ACK-NACK, NACK-ACK and NACK-NACK combination for the second transport block and the third transport block, respectively, as a NACK; and
  when four transport blocks of information are used:
    co-representing an ACK for the first transport block and an ACK for the fourth transport block as an ACK; and
    co-representing the ACK-NACK, NACK-ACK and NACK-NACK combination for the first transport block and the fourth transport block, respectively, as a NACK.

According to a third aspect there is provided a user equipment, UE, in a multi-antenna wireless communications system. The UE comprises processing circuitry configured to bundle, or co-represent, a Hybrid Automatic Repeat Request, HARQ, Acknowledgement, ACK/NACK, to be sent in response for a transport block with the HARQ-ACK/NACK to be sent in response for another transport block, when more than two transport blocks are used.

According to a fourth aspect there is provided a User Equipment, UE, configured to encode Hybrid Automatic Repeat Request, HARQ, Acknowledgements, ACK/NACK, for a High Speed Dedicated Physical Control Channel, HS-DPCCH, in a multi-antenna wireless communications system. The UE is configured in Multiple Input Multiple Output, MIMO, mode with four transmits antennas or more.

The UE is configured to, when three or four transport blocks are used, co-represent an ACK for the second transport block and an ACK for the third transport block as an ACK, and co-represent the ACK-NACK, NACK-ACK and NACK-NACK combination for the second transport block and the third transport block, respectively, as a NACK.

The UE is configured to, when four transport blocks of information are used, co-represent an ACK for the first transport block and an ACK for the fourth transport block as an ACK, and co-represent the ACK-NACK, NACK-ACK and NACK-NACK combination for the first transport block and the fourth transport block, respectively, as a NACK.

According to a fifth aspect there is also provided a method performed by a network node in a multi-antenna wireless communications system. The network node receives bundled HARQ-ACK/NACK information for at least two transport blocks from a User Equipment, UE. The method comprises the steps of:

receiving, when three transport blocks are used, a first bundled ACK/NACK for a second and a third transport block; and receiving, when four transport blocks are used, a first bundled ACK/NACK for a second and a third scheduled transport block and a second bundled ACK/NACK for a first and a fourth transport block.

According to a sixth aspect there is also provided a network node in a multi-antenna wireless communications system. The network node is configured to receive bundled HARQ-ACK/NACK information for at least two transport blocks from a User Equipment, UE.

The network node is configured to receive, when three transport blocks are used, a first single ACK/NACK for a second and a third transport block, and The network node is configured to receive, when four transport blocks are used, a first single ACK/NACK for a second and a third scheduled transport block and a second single ACK/NACK for a first and a fourth transport block.

According to a seventh aspect there is provided a computer program configured to encode, when executed by a processing circuit, Hybrid Automatic Repeat Request, HARQ, Acknowledgements, ACK/NACK, in a multi-antenna wireless communications system. The computer program comprises:

computer program code configured to bundle, also referred to as co-represent, the HARQ-ACK/NACK to be sent in response for a transport block of information with the HARQ-ACK/NACK to be sent in response for another transport block of information, when more than two transport blocks of information are used; and computer program code configured to encode the bundled HARQ-ACK/NACK information.

According to an eighth aspect there is provided a computer program product, embodied in a computer-readable medium, including a computer program according to the seventh aspect.

In this way, it is possible to encode HARQ-ACK/NACK information in an efficient way, and maintain high system performance in a multi-antenna wireless communications system.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 1 is a schematic block diagram illustrating embodiments in a telecommunications system, FIG. 2 is a signalling diagram illustrating messages exchanged between a network node and a user equipment during a data call setup, FIG. 3 is a schematic block diagram illustrating a HS-DPCCH structure for a single carrier, FIG. 4 is a table illustrating the MIMO codebook for 1-2 transmit antennas according to Release 7 MIMO, FIG. 10 is a table illustrating a MIMO codebook for 1-4 transmit antennas, FIG. 11 is a table illustrating the continuation of the MIMO codebook for 1-4 transmit antennas shown in FIG. 10, FIG. 13 is a schematic block diagram of embodiments of a network node, FIG. 14 is a schematic block diagram of embodiments of a user equipment.

DETAILED DESCRIPTION

Figure 5:
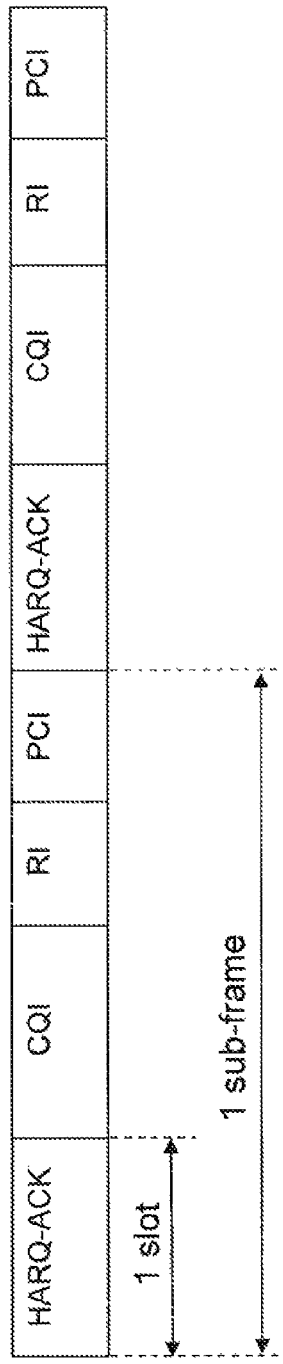
FIG. 5 is a schematic block diagram illustrating a HS-DPCCH slot format.

The figures are schematic and simplified for clarity, and they merely show details which are essential to the understanding of the embodiments, while other details have been left out. Throughout, the same reference numerals are used for identical or corresponding parts or steps.

For a better understanding it may be useful to begin with a brief overview of an example of a communications system and an example of an application to a MIMO system. It should though be understood that the proposed technology is not limited thereto.

FIG. 1 depicts a telecommunications system 100 in which embodiments herein may be implemented. The cellular communications system 100 is a wireless communication network such as an HSDPA, Long Term Evolution (LTE), Wideband Code Division Multiple Access (WCDMA), Global System for Mobile communications (GSM) network, any 3GPP cellular network, or any cellular network or system.

The telecommunications system 100 comprises a base station, which is a network node and is therefore referred to herein as the network node 110. The network node 110 may in this example e.g. be an eNB, eNodeB, or a Home Node B, a Home eNode B, femto Base Station (BS), pico BS or any other network unit capable to serve a user equipment or a machine type communication device, such as e.g. the user equipment 121.

The user equipment 121 is configured to communicate within the telecommunications system 102 via the network node 110 over a radio link 130 when served by the network node 110. The user equipment 121 may, for example, be a mobile terminal or a wireless terminal, a mobile phone, a computer such as for example a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Overview of Channel Quality Reporting and Node B Procedures for Two (2) Branch MIMO in a Release 7 MIMO System FIG. 2 shows the messages exchanged between the network node 110 and the UE 121 during typical data call set up. From the Common Pilot CHannel (CPICH), the user equipment 121 may estimate the channel and compute the CQI and PCI. This information along with the hybrid ARQ ACK/NACK is reported to the network node 110 using a High Speed Dedicated Physical Control CHannel (HS-DPCCH). The periodicity of HS-DPCCH is one subframe, i.e. 2 ms.

FIG. 3 shows the structure of a HS-DPCCH for a single carrier.

For 2 transmit antennas, the CQI is computed as shown in Eq.1 below:

$$CQI = \begin{cases} 15 \times CQI_1 + CQI_2 + 31 & \text{when 2 transport blocks are preferred by the } UE \\ CQI_S & \text{when 1 transport block is preferred by the } UE \end{cases} \quad (\text{Eq. 1})$$

where CQI is the channel quality per individual layer.

It can be observed from Eq. 1 above that if the CQI is less than 31, then the Rank Information is 1. This means that the number of layers/streams that the user equipment prefers is 1 and that a single scheduled transport block will be used in the HARQ-ACK. Otherwise, the Rank Information (RI) is 2. This means that the number of layers/streams that the user equipment prefers is 2 and that two scheduled transport blocks will be used in the HARQ-ACK.

PCI is the precoding information bits selected in the subset of the codebook corresponding to the Rank Information.

FIG. 4 shows a table of the MIMO Codebook for 1-2 transmit antennas according to Release 7 MIMO, see reference [3]. For representing ACK/NACK in a two (2) branch MIMO (i.e. using up to two transmit antennas) in a Release 7 MIMO system, this 10 bit codebook is used as shown by the table FIG. 4.

This codebook has been developed since the system performance is very sensitive to the ACK/NACK information. Errors in its report can degrade the performance of the system severely. Hence, this codebook is designed to maximize the Hamming distance between the code vectors using a 10 bit feedback (1024 combinations).

Once the network node 110 receives this information (i.e. the hybrid ARQ ACK/NACK, CQI and PCI), the network node 110 allocates the required channelization codes, the modulation and coding, the precoding channel index to the user equipment 121 after scheduling. This information is conveyed by the network node 110 to user equipment 121 by using High Speed Shared Control CHannel (HS-SCCH). Once the user equipment 110 detects the HS-SCCH, downlink transmission starts through a data traffic channel using the Physical Downlink Shared Channel (HS-PDSCH).

Channel Quality Information (CQI) for a Four (4) Branch MIMO with 2 Codewords

For a four (4) branch MIMO, the user equipment 121 has to inform the network node 110 through the feedback channel the following:

HARQ ACK information (10 bits)
One CQI per codeword.
Here, two (2) codewords is assumed, since it proposed to used two (2) codewords in the standard for four (4) branch MIMO in order to reduce the signalling overhead at downlink (DL) and uplink (UL). Thus, two codewords is used.
RI, Rank Information (2 bits)
This indicates the number of layers/streams the user equipment 121 is preferring.
PCI, Precoding Control Index in the RI (4 bits)

FIG. 5 shows the structure of a HS-DPCCH slot format for a four (4) branch MIMO. As shown in FIG. 4, the user equipment 121 conveys HARQ ACK information and information about the preferred number of streams RI, CQI and PCI corresponding to that preferred number of streams RI to the network node 110.

Figure 6:
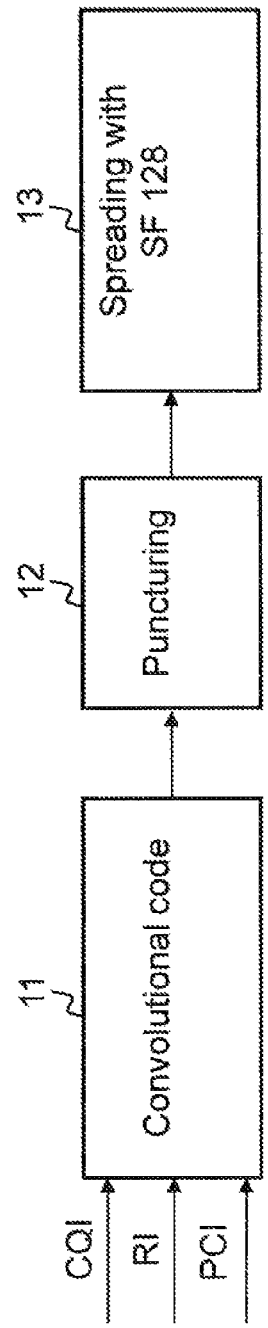
FIG. 6 is a schematic block diagram illustrating a transmission diagram for a Type A report.

FIG. 6 shows a transmission diagram for a Type A report. For Type A reporting, eight (8) information bits are used to describe the CQI information for both the codewords, two (2) information bits are used to convey the rank information RI and four (4) information bits are used to describe the PCI information. The resulting composite CQI/RI/PCI report is encoded with a convolutional code 11. Then, it is rate matched to make 40 encoded bits, i.e. puncturing 12 is performed. After this, it is spread 13 with spreading factor (SF) of 128.

Figure 7A:
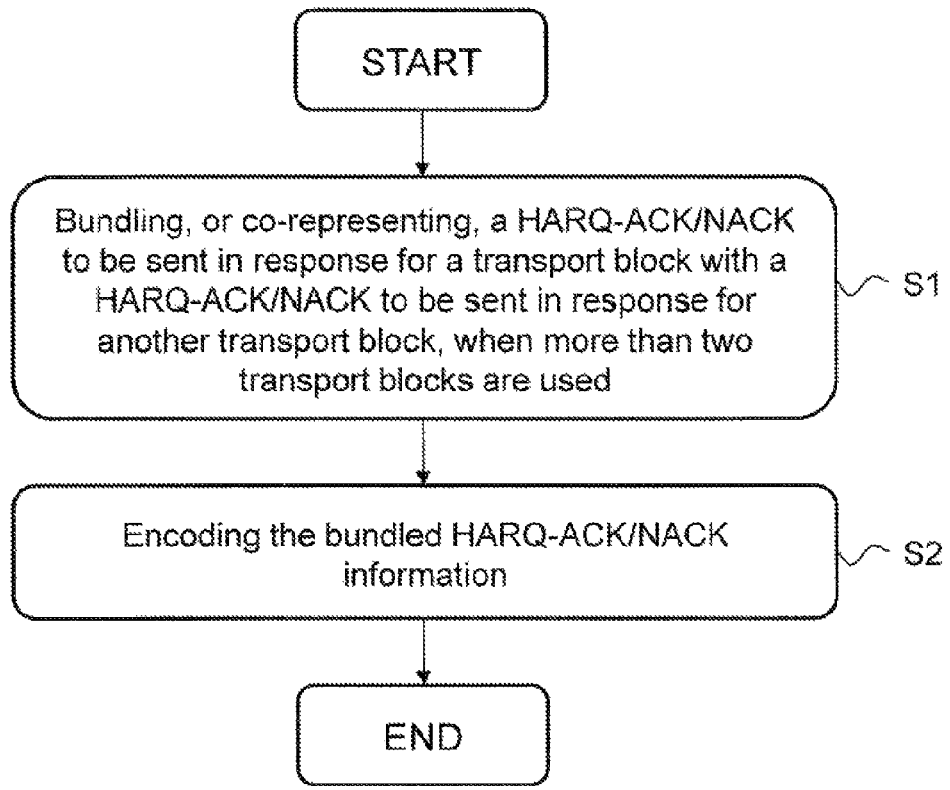
FIG. 7A is a schematic flow diagram illustrating an example of a method for encoding HARQ Acknowledgements in a multi-antenna wireless communications system according to an embodiment.

FIG. 7A is a schematic flow diagram illustrating an example of a method for encoding HARQ Acknowledgements in a multi-antenna wireless communications system according to an embodiment.

Step S1 involves bundling, also referred to as co-representing, a HARQ-ACK/NACK to be sent in response for a transport block of information with a HARQ-ACK/NACK to be sent in response for another transport block of information, when more than two transport blocks of information are used.

Step S2 involves encoding the bundled HARQ-ACK/NACK information.

Figure 7B:
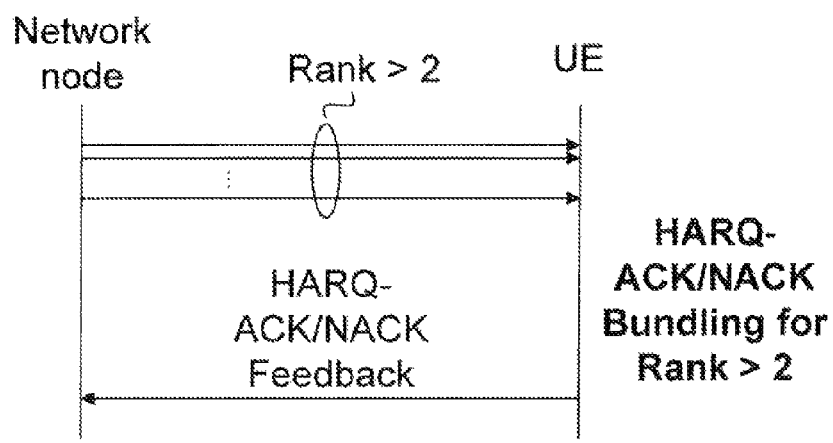
FIG. 7B is a schematic signaling diagram illustrating an example of HARQ-ACK/NACK feedback for communication with a rank higher than two according to an embodiment.

This corresponds to a rank higher than two, meaning that the number of streams for the communication is higher than two. Each of the considered transport blocks belongs to a respective stream. As schematically illustrated in the signalling diagram of FIG. 7B, the transport blocks are simultaneously transmitted 'in parallel' from the network node and correspondingly received by the UE, which then generates the HARQ ACK/NACK feedback information related to the transport blocks.

In this context, the proposed technology makes it possible to efficiently represent HARQ-ACK/NACK information even for a rank higher than two, i.e. when HARQ-ACK/NACK information for more than two simultaneous streams are encoded.

By means of the proposed technology, it is thus possible to maintain high system performance in a multi-antenna wireless communications system even when using rank three or higher.

Figure 8:
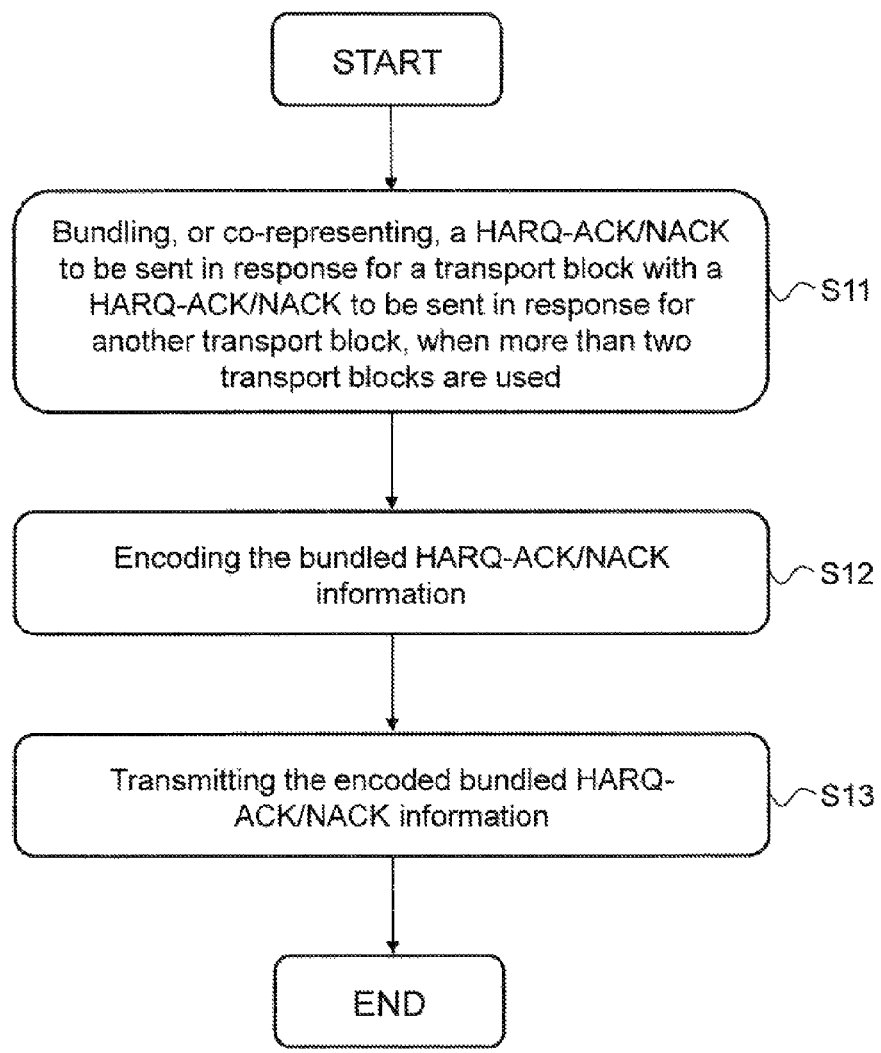
FIG. 8 is a schematic flow diagram illustrating an example of a method for encoding HARQ Acknowledgements in an uplink transmission to a network node according to an embodiment.

FIG. 8 is a schematic flow diagram illustrating an example of a method for encoding HARQ Acknowledgements in an uplink transmission to a network node according to an embodiment.

Step S11 involves bundling, also referred to as co-representing, a HARQ-ACK/NACK to be sent in response for a transport block of information with a HARQ-ACK/NACK to be sent in response for another transport block of information, when more than two transport blocks of information are used.

Step S12 involves encoding the bundled HARQ-ACK/NACK information.

Step S13 involves transmitting the encoded bundled HARQ-ACK/NACK information in the uplink transmission to the network node.

As an example, the uplink transmission may be performed on a High Speed Dedicated Physical Control Channel, HS-DPCCH.

By way of example, the user equipment is configured in Multiple Input Multiple Output, MIMO, mode with four transmits antennas or more. In this context, the method is preferably performed to achieve an encoding for a four branch MIMO system, where up to 4 transport blocks of information may be processed simultaneously.

By bundling a HARQ-ACK/NACK to be sent in response for a transport block of information with a HARQ-ACK/NACK to be sent in response for another transport block of information, the inventors have realized that it is possible to encode the bundled HARQ-ACK/NACK information using an existing MIMO codebook. An advantage with this design is that a codebook that gives a maximum Hamming distance can be re-used.

As an example, the existing MIMO codebook is an existing MIMO codebook for HARQ-ACK of up to two transmit antennas, i.e. up to two scheduled transport blocks.

In a particular example, an ACK/NACK for the second transport block of information is bundled with an ACK/NACK for the third transport block of information, when three or four transport blocks of information are used, corresponding to a rank of three or four.

For example, the ACK/NACK for the second transport block of information may be bundled with an ACK/NACK for the third transport block of information as a first single ACK/NACK, which is encoded as in accordance with the response to the second or secondary transport block column in the existing MIMO codebook for 1-2 transmit antennas according to Release 7 MIMO.

Figure 9:
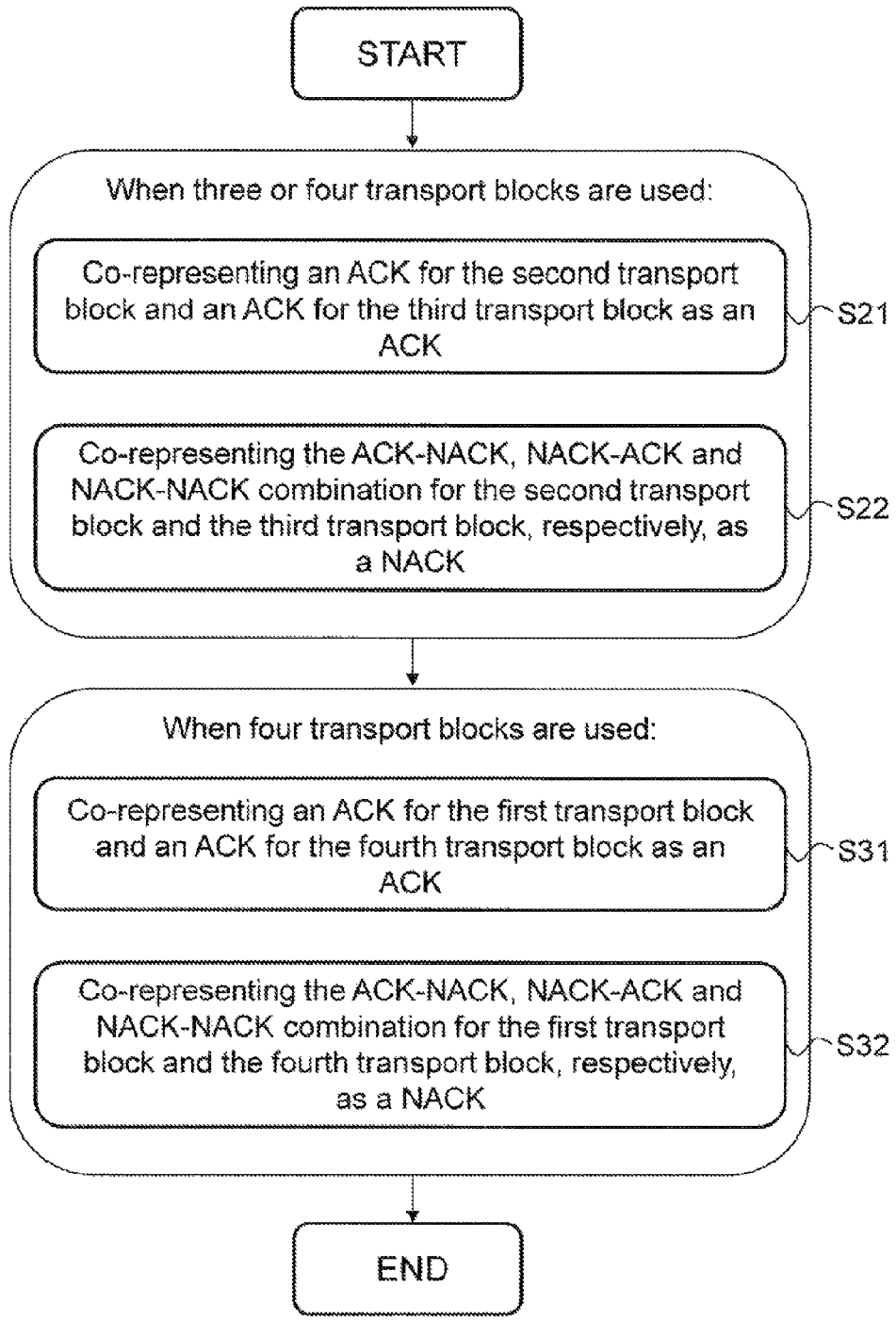
FIG. 9 is a schematic flow diagram illustrating a particular example of a method for encoding HARQ Acknowledgements for a HS-DPCCH channel in a multi-antenna wireless communications system according to an embodiment.

In particular, as schematically illustrated in FIG. 9, an ACK for the second transport block of information and an ACK for the third transport block of information may be co-represented or bundled as an ACK in step S21, and the ACK-NACK, NACK-ACK and NACK-NACK combination for the second transport block of information and the third transport block of information, respectively, may be co-represented or bundled as a NACK in step S22.

In addition, an ACK/NACK for the first transport block of information may be bundled with an ACK/NACK for the fourth transport block of information, when four transport blocks of information are used, corresponding to a rank of four.

For example, an ACK/NACK for the first transport block of information may be bundled with an ACK/NACK for the fourth transport block of information as a second single ACK/NACK, which is encoded in accordance with the response to the first or primary transport block column in the existing MIMO codebook for 1-2 transmit antennas according to Release 7 MIMO.

In particular, as schematically illustrated in FIG. 9, an ACK for the first transport block of information and an ACK for the fourth transport block of information may be co-represented or bundled as an ACK in step S31, and the ACK-NACK, NACK-ACK and NACK-NACK combination for the first transport block of information and the fourth transport block of information, respectively, may be co-represented or bundled as a NACK in step S32.

The particular embodiment shown in FIG. 9 is particularly useful for encoding Hybrid Automatic Repeat Request, HARQ, Acknowledgements, ACK/NACK, for a High Speed Dedicated Physical Control Channel, HS-DPCCH, in a multi-antenna wireless communications system, where the UE is configured in Multiple Input Multiple Output, MIMO, mode with four transmits antennas or more.

According to a specific example, a HARQ acknowledgement message is encoded to 10 bits, denoted $w_0, w_1, \ldots w_9$ as shown in the following Table 1A:

TABLE 1A

Example of HARQ Acknowledgement Encoding

| HARQ-ACK message to be transmitted | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| HARQ-ACK in response to a single scheduled transport block | | | | | | | | | | | |
| ACK | | 1 | 1 | 1 | 1 | 1 | 1 | 1 | 1 | 1 | 1 |
| NACK | | 0 | 0 | 0 | 0 | 0 | 0 | 0 | 0 | 0 | 0 |
| HARQ-ACK in response to two scheduled transport blocks | | | | | | | | | | | |
| Response to primary transport block | Response to secondary transport block | | | | | | | | | | |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |

TABLE 1A-continued

Example of HARQ Acknowledgement Encoding

| HARQ-ACK message to be transmitted | | | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|---|---|
| HARQ-ACK in response to three scheduled transport blocks | | | | | | | | | | | | | |
| Response to primary transport block | Response to secondary transport block | Response to third transport block | | | | | | | | | | | |
| ACK | ACK | ACK | | 1 | 0 | 1 | 0 | 1 | 1 | 1 | 1 | 0 | 1 |
| ACK | NACK | ACK | | 1 | 1 | 0 | 1 | 0 | 1 | 0 | 1 | 1 | 1 |
| NACK | ACK | ACK | | 0 | 1 | 1 | 1 | 1 | 0 | 1 | 0 | 1 | 1 |
| NACK | NACK | ACK | | 1 | 0 | 0 | 1 | 0 | 0 | 1 | 0 | 0 | 0 |
| ACK | ACK | NACK | | 1 | 1 | 0 | 1 | 0 | 1 | 0 | 1 | 1 | 1 |
| ACK | NACK | NACK | | 1 | 1 | 0 | 1 | 0 | 1 | 0 | 1 | 1 | 1 |
| NACK | ACK | NACK | | 1 | 0 | 0 | 1 | 0 | 0 | 1 | 0 | 0 | 0 |
| NACK | NACK | NACK | | 1 | 0 | 0 | 1 | 0 | 0 | 1 | 0 | 0 | 0 |
| HARQ-ACK in response to four scheduled transport blocks | | | | | | | | | | | | | |
| Response to primary transport block | Response to secondary transport block | Response to third transport block | Response to fourth transport block | | | | | | | | | | |
| ACK | ACK | ACK | ACK | 1 | 0 | 1 | 0 | 1 | 1 | 1 | 1 | 0 | 1 |
| ACK | NACK | ACK | ACK | 1 | 1 | 0 | 1 | 0 | 1 | 0 | 1 | 1 | 1 |
| NACK | ACK | ACK | ACK | 0 | 1 | 1 | 1 | 1 | 0 | 1 | 0 | 1 | 1 |
| NACK | NACK | ACK | ACK | 1 | 0 | 0 | 1 | 0 | 0 | 1 | 0 | 0 | 0 |
| ACK | ACK | NACK | ACK | 1 | 1 | 0 | 1 | 0 | 1 | 0 | 1 | 1 | 1 |
| ACK | NACK | NACK | ACK | 1 | 1 | 0 | 1 | 0 | 1 | 0 | 1 | 1 | 1 |
| NACK | ACK | NACK | ACK | 1 | 0 | 0 | 1 | 0 | 0 | 1 | 0 | 0 | 0 |
| NACK | NACK | NACK | ACK | 1 | 0 | 0 | 1 | 0 | 0 | 1 | 0 | 0 | 0 |
| ACK | ACK | ACK | NACK | 0 | 1 | 1 | 1 | 1 | 0 | 1 | 0 | 1 | 1 |
| ACK | NACK | ACK | NACK | 1 | 0 | 0 | 1 | 0 | 0 | 1 | 0 | 0 | 0 |
| NACK | ACK | ACK | NACK | 0 | 1 | 1 | 1 | 1 | 0 | 1 | 0 | 1 | 1 |
| NACK | NACK | ACK | NACK | 1 | 0 | 0 | 1 | 0 | 0 | 1 | 0 | 0 | 0 |
| ACK | ACK | NACK | NACK | 1 | 0 | 0 | 1 | 0 | 0 | 1 | 0 | 0 | 0 |
| ACK | NACK | NACK | NACK | 1 | 0 | 0 | 1 | 0 | 0 | 1 | 0 | 0 | 0 |
| NACK | ACK | NACK | NACK | 1 | 0 | 0 | 1 | 0 | 0 | 1 | 0 | 0 | 0 |
| NACK | NACK | NACK | NACK | 1 | 0 | 0 | 1 | 0 | 0 | 1 | 0 | 0 | 0 |
| PRE/POST indication | | | | | | | | | | | | | |
| PRE | | | | 0 | 0 | 1 | 0 | 0 | 1 | 0 | 0 | 1 | 0 |
| POST | | | | 0 | 1 | 0 | 0 | 1 | 0 | 0 | 1 | 0 | 0 |

In a preferred example, as previously explained in connection with FIG. 9, when three or four transport blocks of information are used, an ACK for the second transport block of information and an ACK for the third transport block of information is co-represented or bundled as an ACK, and the ACK-NACK, NACK-ACK and NACK-NACK combination for the second transport block of information and the third transport block of information, respectively, is co-represented or bundled as a NACK. When four transport blocks of information are used, an ACK for the first transport block of information and an ACK for the fourth transport block of information is co-represented or bundled as an ACK, and the ACK-NACK, NACK-ACK and NACK-NACK combination for the first transport block of information and the fourth transport block of information, respectively, is co-represented or bundled as a NACK. In this particularly advantageous case, the Table 1A above can be represented in the following equivalent form in Table 1B:

TABLE 1B

Example of HARQ Acknowledgement Encoding

| HARQ-ACK message to be transmitted | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|
| HARQ-ACK in response to a single scheduled transport block | | | | | | | | | | |
| ACK | 1 | 1 | 1 | 1 | 1 | 1 | 1 | 1 | 1 | 1 |
| NACK | 0 | 0 | 0 | 0 | 0 | 0 | 0 | 0 | 0 | 0 |

TABLE 1B-continued

Example of HARQ Acknowledgement Encoding

| HARQ-ACK message to be transmitted | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| HARQ-ACK in response to two scheduled transport blocks | | | | | | | | | | | |
| Response to primary transport block | Response to secondary transport block | | | | | | | | | | |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |
| HARQ-ACK in response to three scheduled transport blocks | | | | | | | | | | | |
| Response to primary transport block | Response to secondary and third transport blocks | | | | | | | | | | |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |
| HARQ-ACK in response to four scheduled transport blocks | | | | | | | | | | | |
| Response to primary and fourth transport blocks | Response to secondary and third transport blocks | | | | | | | | | | |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |
| PRE/POST indication | | | | | | | | | | | |
| | PRE | 0 | 0 | 1 | 0 | 0 | 1 | 0 | 0 | 1 | 0 |
| | POST | 0 | 1 | 0 | 0 | 1 | 0 | 0 | 1 | 0 | 0 |

By way of example, the multi-antenna wireless communications system may be a High Speed Downlink Packet Access, HSDPA, system.

EXAMPLE

HARQ Codebook for a Four (4) Branch MIMO System

As can be seen above, since it is recommended for a four (4) branch MIMO system to use the same number of bits as that of Release 7 MIMO, i.e. 10 bits, the Release 7 MIMO codebook (as shown in FIG. 4) should preferably be used.

However, in a four (4) branch MIMO system, the user equipment 121 can decode up to 4 transport blocks simultaneously. Since all this information needs to be fit into 10 bits, a HARQ codebook for mapping 4 ACK/NACKs, i.e. one for each transport block, to the 10 bits needs to be used. An example of such a HARQ codebook is shown in FIGS. 10-11, corresponding to the Tables set forth above.

FIGS. 10-11 shows a table of a MIMO Codebook for 1-4 transmit antennas. The table illustrates one way to represent up to 4 ACK/NACKs in a 10 bit codeword, as required by the four (4) branch MIMO system.

It is desirable to achieve an encoding for a four (4) branch MIMO system for mapping 4 ACK/NACKs to 10 bits that is also efficient in terms of maximization of the Hamming distance between any of the codewords therein.

According to an embodiment, this object is achieved by a method and a corresponding user equipment for encoding Hybrid Automatic Repeat Request, HARQ, Acknowledgements, ACK/NACK, in an uplink transmission to a network node in a multi-antenna wireless communications system.

Hence, examples of embodiments of a method in a user equipment 121 for encoding Hybrid Automatic Repeat Request, HARQ, Acknowledgements, ACK/NACK, in an uplink transmission to a network node 110 in a multi-antenna wireless communications system 100 will now be described below.

The user equipment 121 bundles the HARQ-ACK/NACK to be sent in response for one scheduled transport block of information with the HARQ-ACK/NACK to be sent in response for another scheduled transport block of information, when more than two scheduled transport blocks of information are used in the downlink transmission of the network node 110.

In some embodiments, the user equipment 121 may encode the bundled HARQ-ACK/NACK information using an existing MIMO codebook, such as, for example, the existing MIMO codebook for HARQ-ACK of up to two (2) transmit antennas, i.e. up to two scheduled transport blocks, according to Release 7 MIMO.

In some embodiments, the user equipment 121 may transmit the encoded bundled HARQ-ACK/NACK information in the uplink transmission to the network node 110.

In some embodiments, a multi-antenna wireless communications system 100 may be a HSPDA system configured for four (4) branch MIMO transmissions. However, the multi-antenna wireless communications system 100 may also be a HSPDA system configured for any number of branches, such as, for example, eight (8) branch MIMO transmissions.

Also, the user equipment 121 and the network node 110 may be configured for four (4) branch MIMO transmissions or any number of branches, such as, for example, eight (8) branch MIMO transmissions. Thus, the user equipment 121 and the network node 110 may be configured in MIMO mode with four (4) transmits antennas or more.

In some embodiments, the uplink transmission in performed on the uplink signalling channel, i.e. the High Speed Dedicated Physical Control CHannel (HS-DPCCH).

When the more than two scheduled transport blocks of information used in the downlink transmission from the network node 110 are three (3) scheduled transport blocks of information, then the Rank Information (RI) is three (3), i.e. the report has a rank of three (3), and that the number of layers/streams that the user equipment 121 prefers for the downlink transmission is three (3).

In some embodiments, when the more than two scheduled transport blocks of information used in the downlink transmission from the network node 110 are three (3) scheduled transport blocks of information, the HARQ-ACK/NACK to be sent in response for the second or secondary scheduled transport block of information is bundled with the third or tertiary scheduled transport block of information. This means that the ACK/NACK for the second scheduled transport block of information is co-represented, i.e. bundled, with the ACK/NACK for the third scheduled transport block of information as a first single ACK/NACK. The first single ACK/NACK may then be encoded as in accordance with the response to the secondary transport block column in the existing MIMO codebook for 1-2 transmit antennas according to Release 7 MIMO.

In this embodiment, the HARQ-ACK/NACK to be sent in response for the first or primary scheduled transport block of information may be encoded in accordance with the response to the primary transport block column in the existing MIMO codebook for 1-2 transmit antennas according to Release 7 MIMO.

In some embodiments, for example as illustrated in the flow diagram of FIG. 9, an ACK for the second scheduled transport block of information and an ACK for the third scheduled transport block of information is co-represented or bundled as an ACK (step S21) in the first single ACK/NACK. In this embodiment, the ACK-NACK, NACK-ACK and NACK-NACK combination for the second scheduled transport block of information and the third scheduled transport block of information, respectively, is co-represented or bundled as a NACK (step S22) in the first single ACK/NACK.

When the more than two scheduled transport blocks of information used in the downlink transmission of the network node 110 are four (4) scheduled transport blocks of information, then the Rank Information (RI) is three (4), i.e. the report has a rank of four (4), and that the number of layers/streams that the user equipment prefers for the downlink transmission is four (4).

In some embodiments, when the more than two scheduled transport blocks of information used in the downlink transmission of the network node 110 are four (4) scheduled transport blocks of information, the HARQ-ACK/NACK to be sent in response for the second scheduled transport block of information is bundled with the third scheduled transport block of information. This means that the ACK/NACK for the second scheduled transport block of information is co-represented, i.e. bundled, with the ACK/NACK for the third scheduled transport block of information as a first single ACK/NACK. The first single ACK/NACK for the second scheduled transport block of information and the third scheduled transport block of information may then be encoded in accordance with the response to the secondary transport block column in the existing MIMO codebook for 1-2 transmit antennas according to Release 7 MIMO.

In this embodiment, the HARQ-ACK/NACK to be sent in response for the first or primary scheduled transport block of information is bundled with the fourth or quaternary scheduled transport block of information. This means that the ACK/NACK for the first scheduled transport block of information is co-represented, i.e. bundled, with the ACK/NACK for the fourth scheduled transport block of information as a second single ACK/NACK. The second single ACK/NACK for the first scheduled transport block of information and the fourth scheduled transport block of information may then be encoded in accordance with the response to the primary transport block column in the existing MIMO codebook for 1-2 transmit antennas according to Release 7 MIMO.

In some embodiments, for example as illustrated in the flow diagram of FIG. 9, an ACK for the second scheduled transport block of information and an ACK for the third scheduled transport block of information is co-represented or bundled as an ACK (step S21) in the first single ACK/NACK. In this embodiment, the ACK-NACK, NACK-ACK and NACK-NACK combination for the second scheduled transport block of information and the third scheduled transport block of information, respectively, is co-represented or bundled as a NACK (step S22) in the first single ACK/NACK.

In some embodiments, and in a similar manner as above, an ACK for the first scheduled transport block of information and an ACK for the fourth scheduled transport block of information is co-represented or bundled as an ACK (step S31) in the second single ACK. In this embodiment, the ACK-NACK, NACK-ACK and NACK-NACK combination for the first scheduled transport block of information and the fourth scheduled transport block of information, respectively, is co-represented or bundled as a NACK (step S32) in the second single ACK.

According to embodiments herein, an alternative to using a HARQ codebook for a four (4) branch MIMO system is described. This is order to achieve an encoding for a four (4) branch MIMO system for mapping 4 ACK/NACKs to 10 bits that is also efficient in terms of maximization of the Hamming distance between any of the codewords therein.

The embodiments herein ensures a low error probability for the HARQ ACK/NACK signalling. This is important so as not to degrade the performance of the system, which is sensitive to errors in the ACK/NACK information.

The embodiments herein provide the maximum Hamming Distance between the codewords, e.g. by reusing the existing MIMO codebook for 1-2 transmit antennas according to Release 7 MIMO. This gives a low error probability for HARQ ACK/NACK signalling.

Hence, according to the above, a technique to represent up to 4 ACK/NACK so that they can be transmitted in the first slot of HS-DPCCH is provided. Hence, system performance in a multi-antenna wireless communications system is maintained.

Figure 12:
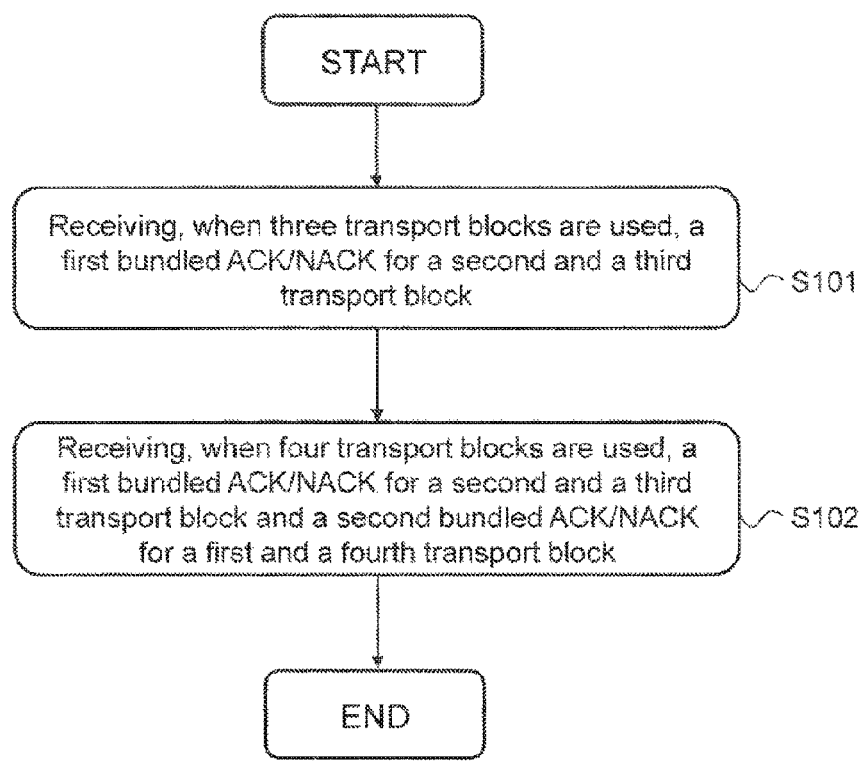
FIG. 12 is a schematic flow diagram illustrating an example of a method performed by a network node in a multi-antenna wireless communications system according to an embodiment.

FIG. 12 is a schematic flow diagram illustrating an example of a method performed by a network node in a multi-antenna wireless communications system according to an embodiment. The network node receives bundled HARQ-ACK/NACK information for at least two transport blocks from a User Equipment, UE. The method comprises the steps of:

receiving, when three transport blocks are used, a first bundled ACK/NACK for a second and a third transport block; and receiving, when four transport blocks are used, a first bundled ACK/NACK for a second and a third scheduled transport block and a second bundled ACK/NACK for a first and a fourth transport block.

This corresponds to a rank higher than two, meaning that more than two transport blocks of information are initially transmitted 'in parallel' from the network node and correspondingly received by the UE, which generates HARQ-ACK/NACK information related to the transport blocks. The above method relates to the situation when the network node subsequently receives the HARQ-ACK/NACK information from the UE. The network node is thus prepared for receiving HARQ-ACK/NACK information related to more than two transport blocks.

The example embodiments presented herein may be utilized in a radio network, which may further comprise network nodes, such as, a base station 110, as illustrated in FIG. 13. The radio network may also comprise a user equipment 121, as illustrated in 10. It should be appreciated that the examples provided in FIGS. 13 and 14 are shown merely as non-limiting examples. According to the example embodiments, the network node 110 and user equipment 121 may be any other node as described in the examples provided in the above sections.

As shown in FIG. 13, the example network node 110 may comprise processing circuitry 903, a memory 902, radio circuitry 901, and at least one antenna. The processing circuitry 903 is connected to the memory 902 and to the radio circuitry 901, which in turn is connected to the antenna(s). The processing circuitry 903 may comprise RF circuitry and baseband processing circuitry (not shown). In particular embodiments, some or all of the functionality described above as being provided by a mobile base station, a base station controller, a relay node, a NodeB, an enhanced NodeB, positioning node, and/or any other type of mobile communications node may be provided by the processing circuitry 903 executing instructions stored on a computer-readable medium, such as the memory 902 shown in FIG. 13. The network node 110 may also comprise a conventional network interface 904. Alternative embodiments of the network node 110 may comprise additional components responsible for providing additional functionality, comprising any of the functionality identified above and/or any functionality necessary to support the solution described above. In other example embodiments, a network node may be not equipped with a radio interface or radio circuitry 901.

Also, some embodiments, the network node 110 may be configured for four (4) branch MIMO transmissions. Furthermore, in some embodiments, the network node 110 may be configured for any number of branches, such as, for example, eight (8) branch MIMO transmissions. Thus, the network node 110 may be configured in MIMO mode with four (4) transmits antennas or more, e.g. equal to the number of MIMO branches it is configured.

It should be appreciated that the processing circuitry, or any other hardware and/or software unit configured to execute operations and/or commands, of the network node 110 may be configured to receive the bundled HARQ-ACK/NACK information for at least two scheduled transport blocks of information from the user equipment 121. For example, the network node 110 may be configured to receive the first single ACK/NACK for the second and third scheduled transport block of information when three (3) scheduled transport blocks are used in the downlink transmission of the network node. In a further example, the network node 110 may also be configured to receive the first single ACK/NACK for the second and third scheduled transport block of information and the second single ACK/NACK for the first and fourth scheduled transport block of information when four (4) scheduled transport blocks are used in the downlink transmission of the network node.

In particular, the network node is configured to receive bundled HARQ-ACK/NACK information for at least two transport blocks from a User Equipment, UE. In this example:

The network node is configured to receive, when three transport blocks are used, a first single ACK/NACK for a second and a third transport block, and The network node is configured to receive, when four transport blocks are used, a first single ACK/NACK for a second and a third scheduled transport block and a second single ACK/NACK for a first and a fourth transport block.

An example of a user equipment 121 is provided in FIG. 14. The example user equipment 121 may comprise processing circuitry 1002, a memory 1003, radio circuitry 1001, and at least one antenna; preferably multiple antennas. The processing circuitry 1002 is connected to the memory 1003 and to the radio circuitry 1001, which in turn is connected to the antenna(s). The radio circuitry 1001 may comprise RF circuitry and baseband processing circuitry (not shown). In particular embodiments, some or all of the functionality described above as being provided by mobile communication devices or other forms of wireless device may be provided by the processing circuitry 1002 executing instructions stored on a computer-readable medium, such as the memory 1003 shown in FIG. 10. Alternative embodiments of the user equipment 121 may comprise additional components responsible for providing additional functionality, comprising any of the functionality identified above and/or any functionality necessary to support the solution described above.

It should be appreciated that the processing circuitry, or any other hardware and/or software unit configured to execute operations and/or commands, of the user equipment 121 may be configured to bundle the HARQ-ACK/NACK to be sent in response for one scheduled transport block of information with the HARQ-ACK/NACK to be sent in response for another scheduled transport block of information, when more than two scheduled transport blocks of information are used. This may be performed by the user equipment 121 according to any of the described embodiments herein.

In particular, the UE comprises processing circuitry 1002 configured to bundle, or co-represent, a Hybrid Automatic Repeat Request, HARQ, Acknowledgement, ACK/NACK, to be sent in response for a transport block with the HARQ-ACK/NACK to be sent in response for another transport block, when more than two transport blocks are used.

The UE 121 may be configured to encode the bundled HARQ-ACK/NACK information.

As an example, the UE 121 may also comprise radio circuitry 1001 configured to transmit the encoded bundled HARQ-ACK/NACK information in an uplink transmission to the network node.

The radio circuitry 1001 may for example be configured to transmit the encoded bundled HARQ-ACK/NACK information in said uplink transmission on a High Speed Dedicated Physical Control Channel, HS-DPCCH.

The UE 121 may be configured in Multiple Input Multiple Output, MIMO, mode with four transmits antennas or more.

In this context, the UE 121 is preferably configured to encode the bundled HARQ-ACK/NACK information using an existing MIMO codebook.

By way of example, the UE 121 may be configured to encode the bundled HARQ-ACK/NACK information using an existing MIMO codebook for HARQ-ACK of up to two transmit antennas, i.e. up to two scheduled transport blocks.

In a particular example, the UE 121 is configured to bundle, an ACK/NACK for the second transport block of information with an ACK/NACK for the third transport block of information, when three or four transport blocks of information are used, corresponding to a rank of three or four.

The UE 121 may be configured to bundle an ACK/NACK for the second transport block of information with an ACK/NACK for the third transport block of information as a first single ACK/NACK, which is encoded as in accordance with the response to the second or secondary transport block column in the existing MIMO codebook for 1-2 transmit antennas according to Release 7 MIMO.

In particular, the UE 121 may be configured to bundle an ACK for the second transport block of information and an ACK for the third transport block of information as an ACK, and to bundle the ACK-NACK, NACK-ACK and NACK-NACK combination for the second transport block of information and the third transport block of information, respectively, as a NACK.

In addition, the UE 121 may be configured to bundle an ACK/NACK for the first transport block of information with an ACK/NACK for the fourth transport block of information, when four transport blocks of information are used, corresponding to a rank of four.

For example, the UE 121 is configured to bundle an ACK/NACK for the first transport block of information with an ACK/NACK for the fourth transport block of information as a second single ACK/NACK, which is encoded in accordance with the response to the first or primary transport block column in the existing MIMO codebook for 1-2 transmit antennas according to Release 7 MIMO.

In particular, the UE 121 may be configured to bundle an ACK for the first transport block of information and an ACK for the fourth transport block of information as an ACK, and to bundle the ACK-NACK, NACK-ACK and NACK-NACK combination for the first transport block of information and the fourth transport block of information, respectively, as a NACK.

In a specific embodiment, the UE 121 may be configured to encode a HARQ acknowledgement message to 10 bits, denoted $w_0, w_1, \ldots w_9$, as shown above in Table 1A or equivalent Table 1 B.

In a particularly advantageous example, the UE 121 is configured to encode Hybrid Automatic Repeat Request, HARQ, Acknowledgements, ACK/NACK, for a High Speed Dedicated Physical Control Channel, HS-DPCCH, in a multi-antenna wireless communications system. In this example, the UE 121 is configured in Multiple Input Multiple Output, MIMO, mode with four transmits antennas or more.

The UE 121 is configured to, when three or four transport blocks are used, co-represent an ACK for the second transport block and an ACK for the third transport block as an ACK, and co-represent the ACK-NACK, NACK-ACK and NACK-NACK combination for the second transport block and the third transport block, respectively, as a NACK; and The UE 121 is configured to, when four transport blocks of information are used, co-represent an ACK for the first transport block and an ACK for the fourth transport block as an ACK, and co-represent the ACK-NACK, NACK-ACK and NACK-NACK combination for the first transport block and the fourth transport block, respectively, as a NACK.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

Although the description is mainly given for a user equipment, as measuring or recording unit, it should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 15:
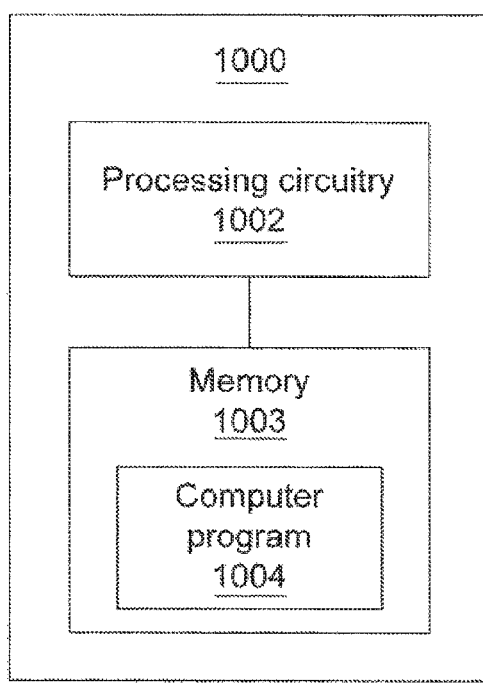
FIG. 15 is a schematic block diagram illustrating an example of a computer-implementation according to an embodiment.

FIG. 15 is a schematic block diagram illustrating an example of a computer-implementation 1000 according to an embodiment. The overall computer-implementation 1000 basically comprises a processing circuit or processing circuitry 1002, and a memory 1003 configured for storing a computer program 1004. In this example, the computer program 1004 is configured to encode, when executed by a processing circuit 1002, Hybrid Automatic Repeat Request, HARQ, Acknowledgements, ACK/NACK, in a multi-antenna wireless communications system.

In this example, the computer program 1004 comprises:
computer program code configured to bundle, also referred to as co-represent, the HARQ-ACK/NACK to be sent in response for a transport block of information with the HARQ-ACK/NACK to be sent in response for another transport block of information, when more than two transport blocks of information are used; and
computer program code configured to encode the bundled HARQ-ACK/NACK information.

There is also provided a computer program product embodied in a computer-readable medium, such as memory 1003, including a computer program as outlined above.

The embodiments herein are not limited to the above described preferred embodiments. Various alternatives, modifications and equivalents may be used. Therefore, the above embodiments should not be construed as limiting. Further information and additional embodiments can also be found in the enclosed Appendix.

Modifications and other embodiments of the disclosed embodiment(s) will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

MIMO Multiple input multiple output
Tx Transmitter
HSDPA High Speed Downlink Packet Access
HARQ Hybrid automatic repeat request
CRC Cyclic redundancy check
NACK Non-Acknowledgement
ACK Acknowledgement
CC Chase combining
IR Incremental Redundancy
UE User Equipment
CQI Channel Quality Information
MMSE Minimum Mean Square Error
TTI Transmit Time Interval
PCI Precoding Control Index or Indicator
HSPA High Speed Packet Access
IMT-A International Mobile Telecommunications Advanced
SNR Signal-to-Noise Ratio
CSI Channel State Information
RI Rank Indicator
HS-DPCCH High Speed Dedicated Physical Control Channel
LTE Long Term Evolution
WCDMA Wideband Code Division Multiple Access
GSM Global System for Mobile communications
BS Base Station
PDA Personal Digital Assistant
CPICH Common Pilot Channel
HS-SCCH High Speed Shared Control Channel
HS-PDSCH High Speed Physical Downlink Shared Channel
UL Uplink
DL Downlink
GPS Global Positioning System
PCS Personal Communications System
RAT Radio Access Technology
MSR Multi-Standard Radio
ROM Read Only Memory
RAM Random Access Memory
CD Compact Disc
DVD Digital Versatile Disc

REFERENCES

[1] 3GPP TSG RAN WG1 Meeting #65, '4-branch MIMO for HSDPA', May 9-13, 2011, R1-111763
[2] 3GPP TSG RAN WG1 Meeting #68, 'Feedback Channel Design for 4 branch MIMO System', Feb. 6-10, 2012, R1-120361
[3] 3GPP TS 25.212

APPENDIX

Some of the embodiments and further embodiments may also be described in the following:

4.2.13.8 High Speed Downlink Shared Channel (HS-DSCH) associated with a DCH
- There can be only one TrCH in an HS-DSCH CCTrCH, i.e. $I = 1$,
- In case the UE is not configured in MIMO mode and in MIMO mode with four transmit antennas or the UE is configured in MIMO mode and single-stream restriction is configured, there can only be one transport block in each transmission time interval, i.e. $M_1 = 1$. In case the UE is configured in MIMO mode, there can be one or two transport blocks in each transmission time interval and in case the UE is configured in MIMO mode with four transmit antennas, there can be up to four transport blocks in each transmission time interval.
- The transmission time interval for TrCHs of HS-DSCH type is always 2 ms.
- The maximum value of the number of HS-PDSCHs $P$ are given from the UE capability class.

4.6 Coding for HS-SCCH type 1

4.6.1 Overview

HS-SCCH shall be of type 1 when the following two conditions are both true:
- the UE is not configured in MIMO mode and in MIMO mode with four transmit antennas, and
- the conditions for usage of HS-SCCH type 2 are not met.

In this section, the terms "HS-SCCH" and "HS-SCCH type 1" are used interchangeably. The following information is transmitted by means of the HS-SCCH type 1 physical channel.

- Channelization-code-set information (7 bits): $X_{ccs,1}, X_{ccs,2}, \ldots, X_{ccs,7}$
- Modulation scheme information (1 bit): $X_{ms,1}$
- Transport-block size information (6 bits): $X_{tbs,1}, X_{tbs,2}, \ldots, X_{tbs,6}$
- Hybrid-ARQ process information (3 bits): $X_{hap,1}, X_{hap,2}, X_{hap,3}$
- Redundancy and constellation version (3 bits): $X_{rv,1}, X_{rv,2}, X_{rv,3}$
- New data indicator (1 bit): $X_{nd,1}$
- UE identity (16 bits): $X_{ue,1}, X_{ue,2}, \ldots, X_{ue,16}$ For an HS-SCCH order,

- $X_{ccs,1}, X_{ccs,2}, \ldots, X_{ccs,7}, X_{ms,1}$ shall be set to '11100000'
- $X_{tbs,1}, X_{tbs,2}, \ldots, X_{tbs,4}$ shall be set to '1111'
- $X_{tbs,5}, X_{tbs,6}$ shall be set to $X_{eodt,1}, X_{eodt,2}$
- $X_{hap,1}, X_{hap,2}, X_{hap,3}, X_{rv,1}, X_{rv,2}, X_{rv,3}$ shall be set to $X_{odt,1}, X_{odt,2}, X_{odt,3}, X_{ord,1}, X_{ord,2}, X_{ord,3}$
- $X_{nd,1}$ is reserved where $X_{eodt,1}, X_{eodt,2}, X_{odt,1}, X_{odt,2}, X_{odt,3}, X_{ord,1}, X_{ord,2}, X_{ord,3}$ are defined in subclause 4.6C.

4.6A Coding for HS-SCCH type 2

4.6A.1 Overview

HS-SCCH type 2 is used for HS-SCCH-less operation. HS-SCCH type 2 is not used when the UE is configured in MIMO mode and in MIMO mode with four transmit antennas. During second and third transmission, the following information is transmitted by means of the HS-SCCH type 2 physical channel.

4.6C Coding for HS-SCCH orders

4.6C.1 Overview

HS-SCCH orders are commands sent to the UE using HS-SCCH. No HS-PDSCH is associated with HS-SCCH orders.

The following information is transmitted by means of the HS-SCCH order physical channel.

- Extended order type (2bits)          $X_{eodt,1}, X_{eodt,2}$
- Order type (3 bits):                 $X_{odt,1}, X_{odt,2}, X_{odt,3}$
- Order (3 bits):                      $X_{ord,1}, X_{ord,2}, X_{ord,3}$
- UE identity (16 bits):               $X_{ue,1}, X_{ue,2}, \ldots, X_{ue,16}$ The coding for HS-SCCH orders is specified in subclause 4.6.1 for a cell where the UE is not configured in MIMO mode in subclause 4.6B.1 for a cell where the UE is configured in MIMO mode, in subclause 4.6D.1 for a cell where the UE is configured in MIMO mode with four transmit antennas with the exception of HS-DSCH serving cell change order, which is always transmitted using HS-SCCH type 1 specified in subclause 4.6.1.

4.6D Coding for HS-SCCH type 4

4.6D.1 Overview

HS-SCCH type 4 is used when the UE is configured in MIMO mode with four transmit antennas. If one transport block is transmitted on the associated HS-PDSCH(s) or an HS- SCCH order is transmitted, the following information is transmitted by means of the HS-SCCH type 3 physical channel:

- Channelization-code-set information (7 bits):

$$X_{ccs,1}, X_{ccs,2}, \ldots, X_{ccs,7}$$

- Modulation scheme and number of transport blocks information (5 bits):

$$X_{ms,1}, X_{ms,2}, X_{ms,3}, X_{ms,4}, X_{ms,5}$$

- Precoding weight information (4 bits):

$$X_{pwipb,1}, X_{pwipb,2}, X_{pwipb,3}, X_{pwipb,4}$$

- Transport-block size information (6 bits):

$$X_{tbspb,1}, X_{tbspb,2}, \ldots, X_{tbspb,6}$$

- Hybrid-ARQ process information (4 bits):

$$X_{hap,1}, X_{hap,2}, \ldots, X_{hap,4}$$

- Redundancy and constellation version (2 bits):

$$X_{rvpb,1}, X_{rvpb,2}$$

- UE identity (16 bits):

$$X_{ue,1}, X_{ue,2}, \ldots, X_{ue,16}$$

For an HS-SCCH order, $X_{ccs,1}, X_{ccs,2}, \ldots, X_{ccs,7}, X_{ms,1}, X_{ms,2}, X_{ms,3}, X_{ms,4}, X_{ms,5}, X_{pwipb,1}, X_{pwipb,2}, X_{pwipb,3}, X_{pwipb,4}$ shall be set to '11100000000000'

$X_{tbspb,1}, X_{tbspb,2}, \ldots, X_{tbspb,4}$ shall be set to '1111'

$X_{tbspb,5}, X_{tbspb,6}$ shall be set to $X_{eodt,1}, X_{eodt,2}$ $X_{hap,1}, X_{hap,2}, X_{hap,3}, X_{hap,4}, X_{rvpb,1}, X_{rvpb,2}$ shall be set to $X_{odt,1}, X_{odt,2}, X_{odt,3}, X_{ord,1}, X_{ord,2}, X_{ord,3}$ where $X_{eodt,1}, X_{eodt,2}, X_{odt,1}, X_{odt,2}, X_{odt,3}, X_{ord,1}, X_{ord,2}, X_{ord,3}$ are defined in subclause 4.6C.

If more than one transport block is transmitted on the associated HS-PDSCHs, the following information is transmitted by means of the HS-SCCH type 4 physical channel:

- Channelization-code-set information (7 bits):

$$X_{ccs,1}, X_{ccs,2}, \ldots, X_{ccs,7}$$

- Modulation scheme and number of transport blocks information (5 bits):

$$X_{ms,1}, X_{ms,2}, X_{ms,3}, X_{ms,4}, X_{ms,5}$$

- Precoding weight information (4 bits):

$$X_{pwipb,1}, X_{pwipb,2}, X_{pwipb,3}, X_{pwipb,4}$$

- Transport-block size information for the primary transport block (6 bits):

$$X_{tbspb,1}, X_{tbspb,2}, \ldots, X_{tbspb,6}$$

- Transport-block size information for the secondary transport block (6 bits):

$$X_{tbssb,1}, X_{tbssb,2}, \ldots, X_{tbssb,6}$$

- Hybrid-ARQ process information (4 bits):

$$X_{hap,1}, X_{hap,2}, \ldots, X_{hap,4}$$

- Redundancy and constellation version for the primary transport block (2 bits):

$$X_{rvpb,1}, X_{rvpb,2}$$

- Redundancy and constellation version for the secondary transport block (2 bits):

$$X_{rvsb,1}, X_{rvsb,2}$$

- UE identity (16 bits):

$$X_{ue,1}, X_{ue,2}, \ldots, X_{ue,16}$$

Figure 19C below illustrates the overall coding chain for HS-SCCH type 4. Note that some information shown is not present if only one transport block is transmitted on the associated HS-PDSCH(s).

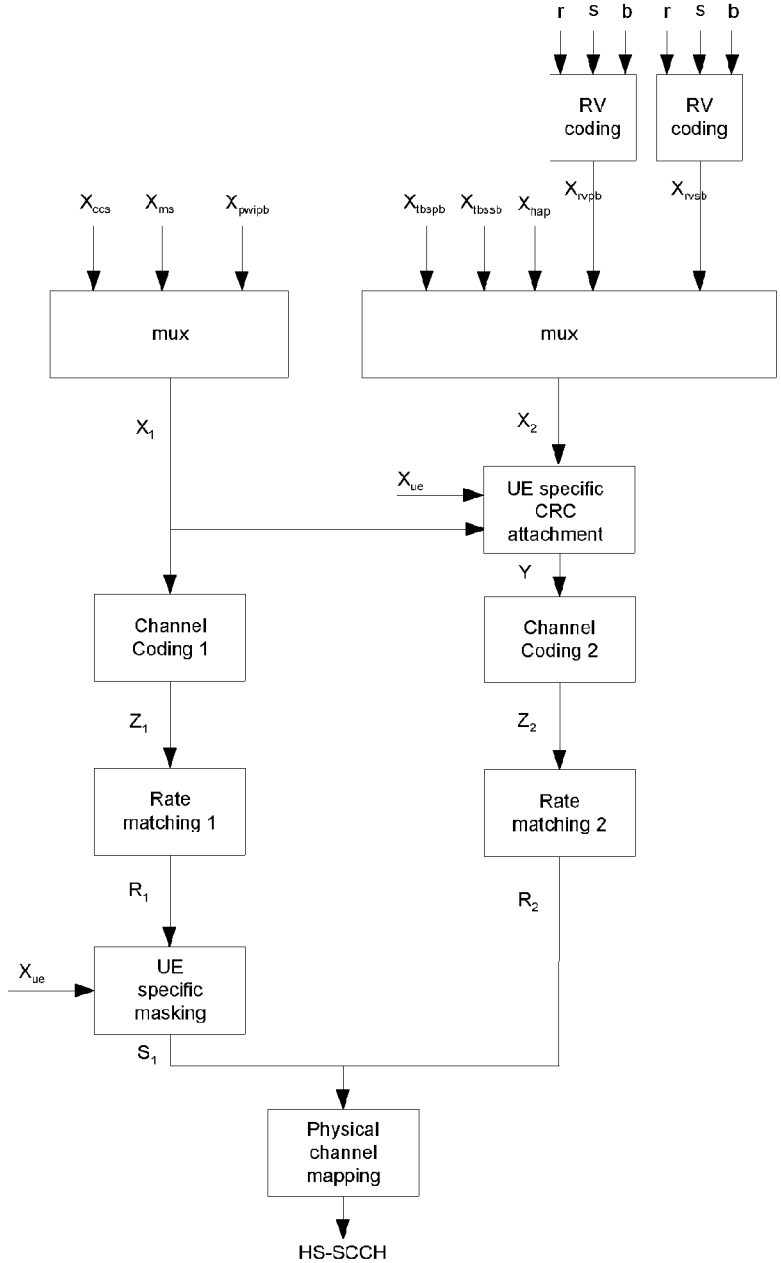

Figure 19C: Coding chain for HS-SCCH type 4

-- vremove 4.6D.2 HS-SCCH type 4 information field mapping

*4.6D.2.1    Redundancy and constellation version coding*

If four transport blocks are transmitted on the associated HS-PDSCH(s), the redundancy version (RV) parameters $r$, $s$ and constellation version parameter $b$ are coded jointly to produce the values $X_{rvpb}$ for the primary and the fourth transport blocks and $X_{rvsb}$ for the second and the third transport blocks respectively. The transmitted sequences $x_{rvpb,1}$, $x_{rvpb,2}$ and $x_{rvsb,1}$, $x_{rvsb,2}$ are the binary representations of $X_{rvpb}$ and $X_{rvsb}$, respectively, where $x_{rvpb,1}$ and $x_{rvsb,1}$ are the MSBs.

If three transport blocks are transmitted on the associated HS-PDSCH(s), the redundancy version (RV) parameters $r$, $s$ and constellation version parameter $b$ are coded jointly to produce the values $X_{rvpb}$ for the primary transport block and $X_{rvsb}$ for the second and the third transport blocks respectively. The transmitted sequences $x_{rvpb,1}$, $x_{rvpb,2}$ and $x_{rvsb,1}$, $x_{rvsb,2}$ are the binary representations of $X_{rvpb}$ and $X_{rvsb}$, respectively, where $x_{rvpb,1}$ and $x_{rvsb,1}$ are the MSBs.

For each of the primary transport block and a secondary transport block if two transport blocks are transmitted on the associated HS-PDSCH(s), the redundancy version (RV) parameters $r$, $s$ and constellation version parameter $b$ are coded jointly to produce the values $X_{rvpb}$ and $X_{rvsb}$ respectively. The transmitted sequences $x_{rvpb,1}$, $x_{rvpb,2}$ and $x_{rvsb,1}$, $x_{rvsb,2}$ are the binary representations of $X_{rvpb}$ and $X_{rvsb}$, respectively, where $x_{rvpb,1}$ and $x_{rvsb,1}$ are the MSBs.

For the primary transport block if only one transport block is transmitted on the associated HS-PDSCH(s), the redundancy version (RV) parameters $r$, $s$ and constellation version parameter $b$ are coded jointly to produce the value $X_{rvpb}$. The transmitted sequence $x_{rvpb,1}$, $x_{rvpb,2}$ is the binary representation of $X_{rvpb}$, where $x_{rvpb,1}$ is the MSB.

Joint coding of parameters $r$, $s$ and constellation version parameter $b$ is done according to tables 14B.3 and 14B.4 according to the modulation mode used. If $X_{rvpb} = 0$ or $X_{rvsb} = 0$, the UE shall treat the corresponding transport block as an initial transmission.

Table 14B.3: RV coding for 16QAM and 64QAM for HS-SCCH type 4

| $X_{rvpb}$ or $X_{rvsb}$ (value) | $N_{sys} / N_{data} < 1/2$ | | | $N_{sys} / N_{data} \geq 1/2$ | | |
|---|---|---|---|---|---|---|
| | s | r | b | s | r | b |
| 0 | 1 | 0 | 0 | 1 | 0 | 0 |
| 1 | 1 | 1 | 1 | 0 | 1 | 1 |
| 2 | 1 | 0 | 2 | 0 | 0 | 0 |
| 3 | 1 | 0 | 3 | 1 | 0 | 2 |

Table 14B.4: RV coding for QPSK for HS-SCCH type 4

| $X_{rvpb}$ or $X_{rvsb}$ (value) | $N_{sys} / N_{data} < 1/2$ | | $N_{sys} / N_{data} \geq 1/2$ | |
|---|---|---|---|---|
| | s | r | s | r |

| 0 | 1 | 0 | 1 | 0 |
|---|---|---|---|---|
| 1 | 1 | 1 | 0 | 1 |
| 2 | 1 | 2 | 0 | 3 |
| 3 | 1 | 3 | 1 | 2 |

*4.6D.2.2    Modulation scheme and number of transport blocks mapping*

The number of transport blocks transmitted on the associated HS-PDSCH(s) and the modulation scheme information are jointly coded as shown in Table 14B.5:

Table 14B.5: Mapping of $x_{ms}$

| xms,1, xms,2, xms,3, xms,4, xms,5 | Modulation for primary transport block | Modulation for secondary transport block | Modulation for third transport block | Modulation for fourth transport block | Number of transport blocks |
|---|---|---|---|---|---|
| 00000 | QPSK | Unused | Unused | Unused | 1 |
| 00001 | 16QAM | Unused | Unused | Unused | 1 |
| 00010 | 64 QAM | Unused | Unused | Unused | 1 |
| 00011 | QPSK | QPSK | Unused | Unused | 2 |
| 00100 | QPSK | 16QAM | Unused | Unused | 2 |
| 00101 | QPSK | 64QAM | Unused | Unused | 2 |
| 00110 | 16QAM | QPSK | Unused | Unused | 2 |
| 00111 | 16QAM | 16QAM | Unused | Unused | 2 |
| 01000 | 16QAM | 64QAM | Unused | Unused | 2 |
| 01001 | 64QAM | QPSK | Unused | Unused | 2 |
| 01010 | 64QAM | 16QAM | Unused | Unused | 2 |
| 01011 | 64QAM | 64QAM | Unused | Unused | 2 |
| 01100 | QPSK | QPSK | QPSK | Unused | 3 |

| | | | | | |
|---|---|---|---|---|---|
| 01101 | QPSK | 16QAM | 16QAM | Unused | 3 |
| 01110 | QPSK | 64QAM | 64QAM | Unused | 3 |
| 01111 | 16QAM | QPSK | QPSK | Unused | 3 |
| 10000 | 16QAM | 16QAM | 16QAM | Unused | 3 |
| 10001 | 16QAM | 64QAM | 64QAM | Unused | 3 |
| 10010 | 64QAM | QPSK | QPSK | Unused | 3 |
| 10011 | 64QAM | 16QAM | 16QAM | Unused | 3 |
| 10100 | 64QAM | 64QAM | 64QAM | Unused | 3 |
| 10101 | QPSK | QPSK | QPSK | QPSK | 4 |
| 10110 | QPSK | 16QAM | 16QAM | QPSK | 4 |
| 10111 | QPSK | 64QAM | 64QAM | QPSK | 4 |
| 11000 | 16QAM | QPSK | QPSK | 16QAM | 4 |
| 11001 | 16QAM | 16QAM | 16QAM | 16QAM | 4 |
| 11010 | 16QAM | 64QAM | 64QAM | 16QAM | 4 |
| 11011 | 64QAM | QPSK | QPSK | 64QAM | 4 |
| 11100 | 64QAM | 16QAM | 16QAM | 64QAM | 4 |
| 11101 | 64 QAM | 64QAM | 64QAM | 64 QAM | 4 |
| 11110 | Unused (Reserved) | | | | |
| 11111 | Unused (Reserved) | | | | |

*4.6D.2.3    Channelization code-set mapping ----- we need modifications here*

The channelization code-set bits $x_{ccs,1}$, $x_{ccs,2}$, ..., $x_{ccs,7}$ are coded according to the following:

5   Given P (multi-)codes starting at code O, and given the HS-SCCH number, then the calculation of the information-field using the unsigned binary representation of integers calculated by the expressions, for the first three bits (code group indicator) of which $x_{ccs,1}$ is the MSB:

$x_{ccs,1}$, $x_{ccs,2}$, $x_{ccs,3}$ = min(P-1,15-P)

P and O shall fulfil |O-1-⌊P/8⌋*15| mod 2 = (HS-SCCH number) mod 2, and then $x_{ccs,4}$, $x_{ccs,5}$, $x_{ccs,6}$, $x_{ccs,dummy}$ = |O-1-⌊P/8⌋*15|, where $x_{ccs,dummy}$ is a dummy bit that is not transmitted on HS-SCCH.

Furthermore, $x_{ccs,7}$ = 0 if the modulation for the secondary transport block is QPSK, and $x_{ccs,7}$ = 1 if the number of transport blocks = 1.

The definitions of P and O are given in [3]. The HS-SCCH number is given by the position in the list of HS-SCCH Channelisation Code Informations signalled by higher layers.

If more than one transport blocks are transmitted on the associated HS-PDSCH(s), the same set of channelization codes shall be used for all transport blocks.

*4.6D.2.4    UE identity mapping*

The UE identity is the HS-DSCH Radio Network Identifier (H-RNTI) defined in [13]. This is mapped such that $x_{ue,1}$ corresponds to the MSB and $x_{ue,16}$ to the LSB, cf. [14].

*4.6D.2.5    HARQ process identifier mapping*

If four transport blocks are transmitted on the associated HS-PDSCH(s), the mapping relationship between the hybrid-ARQ processes and the transport blocks is such that when the HARQ-process with identifier $HAP_{pb}$ is mapped to the primary and the fourth transport block, the HARQ-process with the identifier given by $(HAP_{pb} + N_{proc}/2) \mod (N_{proc})$ shall be mapped to the second and the third transport block, where $N_{proc}$ is the number of HARQ processes configured by higher layers. The combination of HARQ-processes is indicated by the hybrid-ARQ process information (4 bits) $x_{hap,1}$, $x_{hap,2}$, $x_{hap,3}$, $x_{hap,4}$ which are the unsigned binary representation of $HAP_{pb}$ where $x_{hap,1}$ is MSB.

If three transport blocks are transmitted on the associated HS-PDSCH(s), the mapping relationship between the hybrid-ARQ processes and the transport blocks is such that when the HARQ-process with identifier $HAP_{pb}$ is mapped to the primary transport block, the HARQ-process with the identifier given by $(HAP_{pb} + N_{proc}/2) \mod (N_{proc})$ shall be mapped to the second and the third transport block, where $N_{proc}$ is the number of HARQ processes configured by higher layers. The combination of HARQ-processes is indicated by the hybrid-ARQ process information (4 bits) $x_{hap,1}$, $x_{hap,2}$, $x_{hap,3}$, $x_{hap,4}$ which are the unsigned binary representation of $HAP_{pb}$ where $x_{hap,1}$ is MSB.

If two transport blocks are transmitted on the associated HS-PDSCH(s), the mapping relationship between the hybrid-ARQ processes and the transport blocks is such that when the HARQ-process with identifier $HAP_{pb}$ is mapped to the primary transport block, the HARQ-process with the identifier given by $(HAP_{pb} + N_{proc}/2) \bmod (N_{proc})$ shall be mapped to the secondary transport block, where $N_{proc}$ is the number of HARQ processes configured by higher layers. The combination of HARQ-processes is indicated by the hybrid-ARQ process information (4 bits) $x_{hap,1}$, $x_{hap,2}$, $x_{hap,3}$, $x_{hap,4}$ which are the unsigned binary representation of $HAP_{pb}$ where $x_{hap,1}$ is MSB.

If only one transport block is transmitted on the associated HS-PDSCH(s), the above mapping is ignored and the hybrid-ARQ process information $x_{hap,1}$, $x_{hap,2}$, $x_{hap,3}$, $x_{hap,4}$ is the unsigned binary representation of the HARQ process identifier where $x_{hap,1}$ is MSB.

4.6D.2.6  Transport block size index mapping

The transport-block size information $x_{tbspb,1}$, $x_{tbspb,2}$, ..., $x_{tbspb,6}$ is the unsigned binary representation of the transport block size index for the primary transport block, where $x_{tbspb,1}$ is the MSB.

If two transport blocks are transmitted on the associated HS-PDSCH(s), the transport-block size information $x_{tbssb,1}$, $x_{tbssb,2}$, ..., $x_{tbssb,6}$ is the unsigned binary representation of the transport block size index for the secondary transport block, where $x_{tbssb,1}$ is the MSB.

If three transport blocks are transmitted on the associated HS-PDSCH(s), the transport-block size information $x_{tbspb,1}$, $x_{tbspb,2}$, ..., $x_{tbspb,6}$ is the unsigned binary representation of the transport block size index for the primary transport block, where $x_{tbspb,1}$ is the MSB and the transport-block size information $x_{tbssb,1}$, $x_{tbssb,2}$, ..., $x_{tbssb,6}$ is the unsigned binary representation of the transport block size index for the second and the third transport blocks, where $x_{tbssb,1}$ is the MSB.

If four transport blocks are transmitted on the associated HS-PDSCH(s), the transport-block size information $x_{tbspb,1}$, $x_{tbspb,2}$, ..., $x_{tbspb,6}$ is the unsigned binary representation of the transport block size index for the primary and the fourth transport blocks, where $x_{tbspb,1}$ is the MSB and the transport-block size information $x_{tbssb,1}$, $x_{tbssb,2}$, ..., $x_{tbssb,6}$ is the unsigned binary representation of the transport block size index for the second and the third transport blocks, where $x_{tbssb,1}$ is the MSB.

4.6D.2.7  Precoding Weight Information mapping

The precoding weight information $x_{pwipb,1}$, $x_{pwipb,2}$, $x_{pwipb,3}$, $x_{pwipb,4}$ is mapped according to Table 14B.6. The quantity $W_n^{\{s\}}$ denotes the matrix defined by the columns given by the set $\{s\}$ from the expression $W_n = I - 2u_n u_n^H / u_n^H u_n$ where $I$ is the $4 \times 4$ identity matrix and the vector $u_n$ is given by Table 14B.6.

Table 14B.6: precoding weight information

| $X_{pwipb,1}, X_{pwipb,2},$ $X_{pwipb,3}, X_{pwipb,4}$ | $u_n$ | Number of transport blocks | | | |
|---|---|---|---|---|---|
| | | 1 | 2 | 3 | 4 |
| 0000 | $u_0 = [1 \; -1 \; -1 \; -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 0001 | $u_1 = [1 \; -j \; 1 \; j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 0010 | $u_2 = [1 \; 1 \; -1 \; 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 0011 | $u_3 = [1 \; j \; 1 \; -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 0100 | $u_4 = [1 \; (-1-j)/\sqrt{2} \; -j \; (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 0101 | $u_5 = [1 \; (1-j)/\sqrt{2} \; j \; (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 0110 | $u_6 = [1 \; (1+j)/\sqrt{2} \; -j \; (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 0111 | $u_7 = [1 \; (-1+j)/\sqrt{2} \; j \; (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 1000 | $u_8 = [1 \; -1 \; 1 \; 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 1001 | $u_9 = [1 \; -j \; -1 \; -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 1010 | $u_{10} = [1 \; 1 \; 1 \; -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 1011 | $u_{11} = [1 \; j \; -1 \; j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 1100 | $u_{12} = [1 \; -1 \; -1 \; 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 1101 | $u_{13} = [1 \; -1 \; 1 \; -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 1110 | $u_{14} = [1 \; 1 \; -1 \; -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |

| 1111 | $u_{15} = \begin{bmatrix} 1 & 1 & 1 & 1 \end{bmatrix}^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

4.6D.3 Multiplexing of HS-SCCH type 4 information  - we can reuse type 3

The channelization-code-set information $x_{ccs,1}$, $x_{ccs,2}$, ..., $x_{ccs,7}$, modulation-scheme and number of transport blocks information $x_{ms,1}$, $x_{ms,2}$, $x_{ms,3}$, $x_{ms,4}$, $x_{ms,5}$ and precoding weight information $x_{pwipb,1}$, $x_{pwipb,2}$, $x_{pwipb,3}$, $x_{pwipb,4}$ are multiplexed together. This gives a sequence of bits $x_{1,1}$, $x_{1,2}$, ..., $x_{1,16}$, where $x_{1,i} = x_{ccs,i}$     $i=1,2,...,7$ $x_{1,i} = x_{ms,i-7}$    $i=8,9,10,11,12$ $x_{1,i} = x_{pwipb,i-12}$    $i=13,14,15,16$ If one transport block is transmitted on the associated HS-PDSCH(s), the transport-block-size information $x_{tbspb,1}$, $x_{tbspb,2}$, ..., $x_{tbspb,6}$, Hybrid-ARQ-process information $x_{hap,1}$, $x_{hap,2}$, ..., $x_{hap,4}$ and redundancy-version information $x_{rvpb,1}$, $x_{rvpb,2}$ are multiplexed together. This gives a sequence of bits $x_{2,1}$, $x_{2,2}$, ..., $x_{2,12}$ where $x_{2,i} = x_{tbs,i}$    $i=1,2,...,6$ $x_{2,i} = x_{hap,i-6}$    $i=7,8,...,10$ $x_{2,i} = x_{rv,i-10}$    $i=11,12$ If two transport blocks are transmitted on the associated HS-PDSCHs, the transport-block-size information for the primary transport block $x_{tbspb,1}$, $x_{tbspb,2}$, ..., $x_{tbspb,6}$, transport-block-size information for the secondary transport block $x_{tbssb,1}$, $x_{tbssb,2}$, ..., $x_{tbssb,6}$, Hybrid-ARQ-process information $x_{hap,1}$, $x_{hap,2}$, ..., $x_{hap,4}$, redundancy-version information for the primary transport block $x_{rvpb,1}$, $x_{rvpb,2}$, and redundancy-version information for the secondary transport block $x_{rvsb,1}$, $x_{rvsb,2}$ are multiplexed together. This gives a sequence of bits $x_{2,1}$, $x_{2,2}$, ..., $x_{2,20}$ where $x_{2,i} = x_{tbspb,i}$    $i=1,2,...,6$ $x_{2,i} = x_{tbssb,i-6}$    $i=7,8,...,12$ $x_{2,i} = x_{hap,i-12}$    $i=13,14,...,16$ $x_{2,i} = x_{rvpb,i-16}$    $i=17,18$ $x_{2,i} = x_{rvsb,i-18}$    $i=19,20$ If three transport blocks are transmitted on the associated HS-PDSCHs, the transport-block-size information for the primary transport block $x_{tbspb,1}$, $x_{tbspb,2}$, ..., $x_{tbspb,6}$, transport-block-size information for the second and the third transport blocks $x_{tbssb,1}$, $x_{tbssb,2}$, ..., $X_{tbssb,6}$, Hybrid-ARQ-process information $x_{hap,1}, x_{hap,2}, ..., x_{hap,4}$, redundancy-version information for the primary transport block $x_{rvpb,1}, x_{rvpb,2}$, and redundancy-version information for the second and the third transport blocks $x_{rvsb,1}, x_{rvsb,2}$ are multiplexed together. This gives a sequence of bits $x_{2,1}, x_{2,2}, ..., x_{2,20}$ where

| | |
|---|---|
| $x_{2,i} = x_{tbspb,i}$ | $i=1,2,...,6$ |
| $x_{2,i} = x_{tbssb,i-6}$ | $i=7,8,...,12$ |
| $x_{2,i} = x_{hap,i-12}$ | $i=13,14,...,16$ |
| $x_{2,i} = x_{rvpb,i-16}$ | $i=17,18$ |
| $x_{2,i} = x_{rvsb,i-18}$ | $i=19,20$ |

If four transport blocks are transmitted on the associated HS-PDSCHs, the transport-block-size information for the primary and the fourth transport blocks $x_{tbspb,1}, x_{tbspb,2}, ..., x_{tbspb,6}$, transport-block-size information for the second and the third transport blocks $x_{tbssb,1}, x_{tbssb,2}, ..., x_{tbssb,6}$, Hybrid-ARQ-process information $x_{hap,1}, x_{hap,2}, ..., x_{hap,4}$, redundancy-version information for the primary and the fourth transport blocks $x_{rvpb,1}, x_{rvpb,2}$, and redundancy-version information for the second and the third transport blocks $x_{rvsb,1}, x_{rvsb,2}$ are multiplexed together. This gives a sequence of bits $x_{2,1}, x_{2,2}, ..., x_{2,20}$ where

| | |
|---|---|
| $x_{2,i} = x_{tbspb,i}$ | $i=1,2,...,6$ |
| $x_{2,i} = x_{tbssb,i-6}$ | $i=7,8,...,12$ |
| $x_{2,i} = x_{hap,i-12}$ | $i=13,14,...,16$ |
| $x_{2,i} = x_{rvpb,i-16}$ | $i=17,18$ |
| $x_{2,i} = x_{rvsb,i-18}$ | $i=19,20$ |

4.6D.4 CRC attachment for HS-SCCH type 4 ---- we need to change here

If one transport block is transmitted on the associated HS-PDSCH(s), from the sequence of bits $x_{1,1}, x_{1,2}, ..., x_{1,12}, x_{2,1}, x_{2,2}, ..., x_{2,12}$ a 16-bit CRC is calculated according to Section 4.2.1.1. This gives a sequence of bits $c_1, c_2, ..., c_{16}$ where $$c_k = p_{im(17-k)} \qquad k=1,2,...,16$$

This sequence of bits is then masked with the UE Identity $x_{ue,1}, x_{ue,2}, ..., x_{ue,16}$ and then appended to the sequence of bits $x_{2,1}, x_{2,2}, ..., x_{2,12}$ to form the sequence of bits $y_1, y_2, ..., y_{28}$, where

| | |
|---|---|
| $y_i = x_{2,i}$ | $i=1,2,...,12$ |
| $y_i = (c_{i-12} + x_{ue,i-12})$ mod 2 | $i=13,14,...,28$ |

If more than one transport blocks are transmitted on the associated HS-PDSCHs, from the sequence of bits $x_{1,1}, x_{1,2}, \ldots, x_{1,16}, x_{2,1}, x_{2,2}, \ldots, x_{2,20}$ a 16-bit CRC is calculated according to Section 4.2.1.1. This gives a sequence of bits $c_1, c_2, \ldots, c_{16}$ where $$c_k = p_{im(17-k)} \qquad k=1,2,\ldots,16$$

This sequence of bits is then masked with the UE Identity $x_{ue,1}, x_{ue,2}, \ldots, x_{ue,16}$ and then appended to the sequence of bits $x_{2,1}, x_{2,2}, \ldots, x_{2,20}$ to form the sequence of bits $y_1, y_2, \ldots, y_{36}$, where $y_i = x_{2,i}$ $\qquad\qquad\qquad\qquad i=1,2,\ldots,20$ $y_i = (c_{i-20} + x_{ue,i-20}) \bmod 2$ $\qquad i=21,22,\ldots,36$

4.6D.5 Channel coding for HS-SCCH type 4

Rate 1/2 convolutional coding, as described in Section 4.2.3.1, is applied to the sequence of bits $x_{1,1}, x_{1,2}, \ldots, x_{1,16}$. This gives a sequence of bits $z_{1,1}, z_{1,2}, \ldots, z_{1,48}$.

If one transport block is transmitted on the associated HS-PDSCH(s), rate 1/3 convolutional coding, as described in Section 4.2.3.1, is applied to the sequence of bits $y_1, y_2, \ldots, y_{28}$. This gives a sequence of bits $z_{2,1}, z_{2,2}, \ldots, z_{2,108}$.

If two transport blocks are transmitted on the associated HS-PDSCHs, rate 1/3 convolutional coding, as described in --- modify here Section 4.2.3.1, is applied to the sequence of bits $y_1, y_2, \ldots, y_{36}$. This gives a sequence of bits $z_{2,1}, z_{2,2}, \ldots, z_{2,132}$.

Note that the coded sequence lengths result from the termination of K=9 convolutional coding being fully applied.

4.6D.6 Rate matching for HS-SCCH type 4

From the input sequence $z_{1,1}, z_{1,2}, \ldots, z_{1,48}$ the bits $z_{1,1}, z_{1,2}, z_{1,4}, z_{1,8}, z_{1,42}, z_{1,45}, z_{1,47}, z_{1,48}$ are punctured to obtain the output sequence $r_{1,1}, r_{1,2} \ldots r_{1,40}$.

If one transport block is transmitted on the associated HS-PDSCH(s), from the input sequence $z_{2,1}, z_{2,2}, \ldots, z_{2,108}$ the bits $z_{2,1}, z_{2,2}, z_{2,3}, z_{2,4}, z_{2,5}, z_{2,6}, z_{2,7}, z_{2,8}, z_{2,12}, z_{2,14}, z_{2,15}, z_{2,24}, z_{2,42}, z_{2,48}, z_{2,63}, z_{2,66}, z_{2,93}, z_{2,96}, z_{2,98}, z_{2,99}, z_{2,101}, z_{2,102}, z_{2,103}, z_{2,104}, z_{2,105}, z_{2,106}, z_{2,107}, z_{2,108}$ are punctured to obtain the output sequence $r_{2,1}, r_{2,2} \ldots r_{2,80}$.

If two transport blocks are transmitted on the associated HS-PDSCHs, from the input sequence $z_{2,1}, z_{2,2}, \ldots, z_{2,132}$ the bits $z_{2,1}, z_{2,2}, z_{2,3}, z_{2,4}, z_{2,5}, z_{2,6}, z_{2,7}, z_{2,8}, z_{2,10}, z_{2,11}, z_{2,13}, z_{2,14}, z_{2,16}, z_{2,19}, z_{2,22}, z_{2,25}, z_{2,28}, z_{2,31}, z_{2,34}, z_{2,37}, z_{2,40}, z_{2,43}, z_{2,46}, z_{2,49}, z_{2,55}, z_{2,61}, z_{2,72}, z_{2,78}, z_{2,84}, z_{2,87}, z_{2,90}, z_{2,93}, z_{2,96}, z_{2,99}, z_{2,102}, z_{2,105}, z_{2,108}, z_{2,111}, z_{2,114}, z_{2,117}, z_{2,119}, z_{2,120}, z_{2,122}, z_{2,123}, z_{2,125}, z_{2,126}, z_{2,127}, z_{2,128}, z_{2,129}, z_{2,130}, z_{2,131}, z_{2,132}$ are punctured to obtain the output sequence $r_{2,1}, r_{2,2} \ldots r_{2,80}$.

4.6D.7 UE specific masking for HS-SCCH type 4

The output bits $s_{1,1}, s_{1,2}...s_{1,40}$ are calculated as described in subclause 4.6.7.

4.6D.8 Physical channel mapping for HS-SCCH type 4

The HS-SCCH sub-frame is described in [2]. The physical channel mapping is carried out as described in subclause 4.6.8.

4.7.1 Overview

Data arrives to the coding unit in form of indicators for measurement indication and HARQ acknowledgement.

The following coding/multiplexing steps can be identified:

- channel coding (see subclauses 4.7.2, 4.7.3, 4.7.3A, 4.7.3B, 4.7.3C and 4.7.3D);
- mapping to physical channels (see subclauses 4.7.4 and 4.7.4A).

The coding/multiplexing for HS-DPCCH is defined separately for the following cases:

- when the UE is not configured in MIMO mode in the serving HS-DSCH cell, and Secondary_Cell_Enabled is 0 or 1 and Secondary_Cell_Active is 0 (see subclause 4.7.2);
- when the UE is configured in MIMO mode in the serving HS-DSCH cell and Secondary_Cell_Enabled is 0 (see subclause 4.7.3);
- when the UE is configured in MIMO mode in at least the serving HS-DSCH cell, and Secondary_Cell_Enabled is 1 and Secondary_Cell_Active is 0 (see subclause 4.7.3B);
- when the UE is not configured in MIMO mode in any cell and Secondary_Cell_Enabled is 1 and Secondary_Cell_Active is 1 (see subclause 4.7.3A);
- when the UE is configured in MIMO mode in at least one cell and Secondary_Cell_Enabled is 1 and Secondary_Cell_Active is 1 (see subclause 4.7.3B);
- when the UE is configured in MIMO mode with four transmit antennas in at least one cell (see subclause 4.7.3D);
- when the UE not configured in MIMO mode with four transmit antennas in any cell and Secondary_Cell_Enabled is equal to 2 or 3 (see applicable subclauses in Table 14C and 14D)
- when the UE not configured in MIMO mode with four transmit antennas in any cell and Secondary_Cell_Enabled is more than 3 (see applicable subclauses in Table 14C.1 and 14D.1)

where Secondary_Cell_Enabled and Secondary_Cell_Active are defined in [4].

Table 14C: Coding for HARQ-ACK when Secondary_Cell_Enabled is 2 or 3

|  | Secondary Cell Enabled is 2 |
|---|---|
|  | UE is configured with two secondary serving HS-DSCH |

| Secondary_Cell_Active | Condition | Serving HS-DSCH cell | 1st Secondary Serving HS-DSCH cell | 2nd Secondary Serving HS-DSCH cell | 3rd Secondary Serving HS-DSCH cell |
|---|---|---|---|---|---|
| | cells | | | | |
| 0, 1, 2 | MIMO is not configured in any cell | 4.7.3C.1 (Note 1) | | | N/A |
| 0 | MIMO is configured in at least one cell | 4.7.3B.1 (Note 3) | | | N/A |
| 1 | MIMO is configured in at least one cell | 4.7.3B.1 (Note 2) | | | N/A |
| 2 | MIMO is configured in at least one cell | 4.7.3B.1 | | 4.7.3B.1 (Note 4) | N/A |

Secondary Cell Enabled is 3
UE is configured with three secondary serving HS-DSCH cells

| Secondary_Cell_Active | Condition | Serving HS-DSCH cell | 1st Secondary Serving HS-DSCH cell | 2nd Secondary Serving HS-DSCH cell | 3rd Secondary Serving HS-DSCH cell |
|---|---|---|---|---|---|
| 0 | - | 4.7.3B.1 (Note 3) | | | |
| 1 | - | 4.7.3B.1 (Note 2) | | | |
| 2, 3 | - | 4.7.3B.1 (Note 1) | | 4.7.3B.1 (Note 1) | |

Note 1: When a cell is deactivated, DTX message is indicated for that cell.

Note 2: HARQ-ACK information is jointly encoded for the pair of serving HS-DSCH cell and the active secondary serving HS-DSCH cell and repeated to fill the whole HARQ-ACK slot in the HS-DPCCH sub-frame as described in subclause 4.7.4.1.

Note 3: HARQ-ACK information for the serving HS-DSCH cell is repeated to fill the whole HARQ-ACK slot in the HS-DPCCH sub-frame as described in subclause 4.7.4.1.

Note 4: HARQ-ACK information for the $2^{nd}$ secondary serving HS-DSCH cell is jointly encoded with a DTX message in place of the $3^{rd}$ secondary serving HS-DSCH cell as described in subclause 4.7.3B.1.

Table 14C.1: Coding for HARQ-ACK of HS-DPCCH when Secondary_Cell_Enabled is more than 3

| | Secondary Cell Enabled is more than 3  UE is configured with more than 3 secondary serving HS-DSCH cells | | | |
|---|---|---|---|---|
| Number of active cells mapped to the HS-DPCCH | Serving HS-DSCH cell | $1^{st}$ Secondary Serving HS-DSCH cell | $2^{nd}$ Secondary Serving HS-DSCH cell | $3^{rd}$ Secondary Serving HS-DSCH cell |
| 1 | 4.7.3B.1 (Note 1) | | | |
| 2 | 4.7.3B.1 (Note 2) | | | |
| 3 | 4.7.3B.1 (Note 3) | | 4.7.3B.1 (Note 3) | |
| 4 | 4.7.3B.1 | | 4.7.3B.1 | |

Note 1: The HARQ-ACK information is repeated to the fill the whole HARQ-ACK slot of HS-DPCCH sub-frame as described in subclause 4.7.4.1.

Note 2: HARQ-ACK information is jointly encoded for the pair of serving HS-DSCH cell and the active secondary serving HS-DSCH cell and repeated to fill the whole HARQ-ACK slot in the HS-DPCCH sub-frame as described in subclause 4.7.4.1.

Note 3: If one of the $1^{st}$, $2^{nd}$, or $3^{rd}$ secondary serving HS-DSCH cells is deactivated a DTX message is indicated for the deactivated cell.

Table 14C.2: Coding for HARQ-ACK transmitted on HS-DPCCH$_2$ when Secondary_Cell_Enabled is more than 3

|  | Secondary Cell Enabled is more than 3 UE is configured with more than 3 secondary serving HS-DSCH cells | | | |
|---|---|---|---|---|
| Number of active cells mapped to the HS-DPCCH$_2$ | 4$^{th}$ secondary serving HS-DSCH cell | 5$^{th}$ Secondary Serving HS-DSCH cell | 6$^{th}$ Secondary Serving HS-DSCH cell | 7$^{th}$ Secondary Serving HS-DSCH cell |
| 1 | 4.7.3B.1 (Note 1) | | | |
| 2 | 4.7.3B.1 (Note 2) | | | |
| 3 | 4.7.3B.1 (Note 3) | | 4.7.3B.1 (Note 3) | |
| 4 | 4.7.3B.1 | | 4.7.3B.1 | |

Note 1: The HARQ-ACK information is repeated to the fill the whole HARQ-ACK slot of HS-DPCCH$_2$ sub-frame as described in subclause 4.7.4.1.

Note 2: The HARQ-ACK information for the two activated secondary serving HS-DSCH cells are jointly encoded and repeated to fill the whole HARQ-ACK slot in the HS-DPCCH$_2$ sub-frame as described in subclause 4.7.4.1.

Note 3: If one of the 4$^{th}$, 5$^{th}$, 6$^{th}$, and 7$^{th}$ secondary serving HS-DSCH cells is deactivated a DTX message is indicated for the deactivated cell.

The order of the cells in HARQ-ACK joint encoding is specified in detail in subclause 4.7.4.1.

Table 14D: Coding for PCI/CQI when Secondary_Cell_Enabled is 2 or 3

|  | Secondary Cell Enabled is 2 UE is configured with two secondary serving HS-DSCH cells | | | |
|---|---|---|---|---|
| Secondary_Cell_Active | Serving HS-DSCH cell | 1$^{st}$ Secondary Serving HS-DSCH cell | 2$^{nd}$ Secondary Serving HS-DSCH cell | 3$^{rd}$ Secondary Serving HS-DSCH cell |
| 0, 1 | | The CQI information for a cell not configured in MIMO is encoded according to subclause 4.7.2.2(Note 1)The composite PCI/CQI information for a cell configured with MIMO is encoded according to | | N/A |

| | subclause 4.7.3.2 (Note 3) | | |
|---|---|---|---|
| 2<br>MIMO is not configured in any cell | The CQI information for the serving HS-DSCH cell is encoded using subclause 4.7.2.2 | The CQI information for the 1$^{st}$ secondary serving HS-DSCH cell and the 2$^{nd}$ secondary serving HS-DSCH cell is encoded according to subclause 4.7.3A.2 | N/A |
| 2 (Otherwise)<br>Note 4 | The CQI information for a cell not configured in MIMO is encoded according to subclause 4.7.2.2.<br>The composite PCI/CQI information for a cell configured with MIMO is encoded according to subclause 4.7.3.2 | | N/A |

Secondary Cell Enabled is 3
UE is configured with three secondary serving HS-DSCH cells

| Secondary_Cell_Active | Serving HS-DSCH cell | 1$^{st}$ Secondary Serving HS-DSCH cell | 2$^{nd}$ Secondary Serving HS-DSCH cell | 3$^{rd}$ Secondary Serving HS-DSCH cell |
|---|---|---|---|---|
| 0, 1<br>Note 3 | The CQI information for a cell not configured in MIMO is encoded according to subclause 4.7.2.2. | | | |
| 2, 3<br>Note 2 | The composite PCI/CQI information for a cell configured with MIMO is encoded according to subclause 4.7.3.2 | | | |

Note 1: If the UE is configured with MIMO in at least one cell, the CQI field for each active cell is repeated to fill the two slot CQI field in the HS-DPCCH sub-frame as described in subclause 4.7.4.2.

Note 2: In the deactivated cell, the PCI/CQI field is DTXed.

Note 3: The CQI or PCI/CQI for each active cell is repeated to fill the two slot CQI or PCI/CQI field in the HS-DPCCH sub-frame as described in subclause 4.7.4.2.

Note 4: The PCI/CQI field for the 3rd secondary serving HS-DSCH cell is DTXed.

Table 14D.1: Coding for PCI/CQI transmitted on HS-DPCCH when Secondary_Cell_Enabled is more than 3

| | Secondary Cell Enabled more than 3<br>UE is configured with more than 3 secondary serving HS-DSCH cells |
|---|---|

| Number of active cells mapped to the HS-DPCCH | Serving HS-DSCH cell | 1st Secondary Serving HS-DSCH cell | 2nd Secondary Serving HS-DSCH cell | 3rd Secondary Serving HS-DSCH cell |
|---|---|---|---|---|
| 1, 2 Note 1 | The CQI information for a cell not configured in MIMO is encoded according to subclause 4.7.2.2. | | | |
| 3, 4 Note 2 | The composite PCI/CQI information for a cell configured with MIMO is encoded according to subclause 4.7.3.2. | | | |

Note 1: The CQI or PCI/CQI for each active cell is repeated to fill the two slot CQI or PCI/CQI field in the corresponding HS-DPCCH sub-frame as described in subclause 4.7.4.2.

Note 2: In the deactivated cell, the PCI/CQI field is DTXed.

Table 14D.2: Coding for PCI/CQI transmitted on HS-DPCCH$_2$ when Secondary_Cell_Enabled is more than 3

| | Secondary Cell Enabled more than 3 UE is configured with more than 3 secondary serving HS-DSCH cells | | | |
|---|---|---|---|---|
| Number of active cells mapped to the HS-DPCCH$_2$ | 4th Secondary serving HS-DSCH cell | 5th Secondary Serving HS-DSCH cell | 6th Secondary Serving HS-DSCH cell | 7th Secondary Serving HS-DSCH cell |
| 1, 2 Note 1 | The CQI information for a cell not configured in MIMO is encoded according to subclause 4.7.2.2. | | | |
| 3, 4 Note 2 | The composite PCI/CQI information for a cell configured with MIMO is encoded according to subclause 4.7.3.2. | | | |

Note 1: The CQI or PCI/CQI for each active cell is repeated to fill the two slot CQI or PCI/CQI field in the corresponding HS-DPCCH sub-frame as described in subclause 4.7.4.2.

Note 2: In the deactivated cell, the PCI/CQI field is DTXed.

For each HS-DPCCH the general coding flow when the UE is not configured in MIMO mode is shown in the figure 20. This is done in parallel for the HARQ-ACK and CQI as the flows are not directly multiplexed but are transmitted at different times. If Secondary_Cell_Active is 0, the number of CQI information bits is 5, otherwise it is 10 bits.

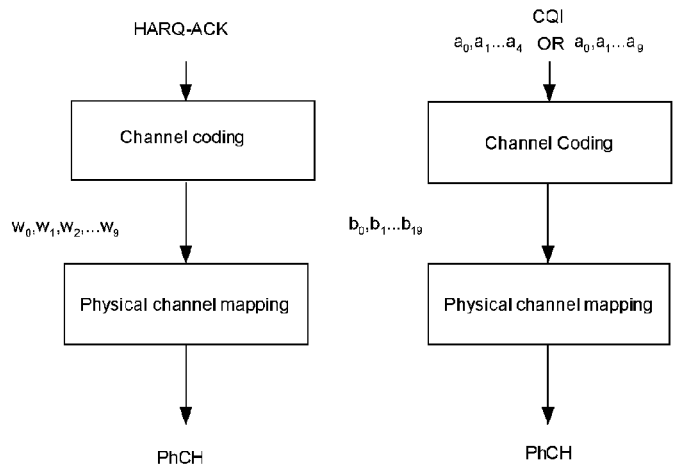

Figure 20: Coding for each HS-DPCCH when the UE is not configured in MIMO mode

In case the UE is configured in MIMO mode, the measurement indication consists of precoding control indication (PCI) and channel quality indication (CQI). For each HS-DPCCH the general coding flow when the UE is configured in MIMO mode is shown in the figure below. This is done in parallel for the flow of HARQ-ACK and for the flow of composite PCI/CQI reports as the two flows are not directly multiplexed but are transmitted at different times

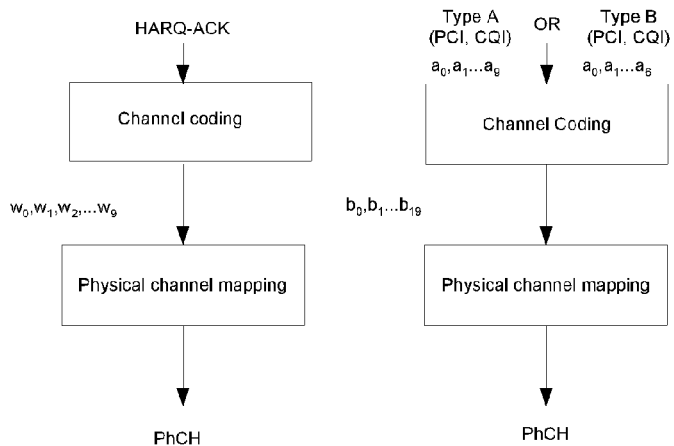

Figure 20A: Coding for each HS-DPCCH when the UE is configured in MIMO mode

In case the UE is configured in MIMO mode with four transmit antennas, the measurement indication consists of number of transport blocks preferred (RI), precoding control indication (PCI) and channel quality indication (CQI). For each HS-DPCCH the general coding flow when the UE is configured in MIMO mode with four transmit antennas is shown in the figure below. This is done in parallel for the flow of HARQ-ACK and for the flow of composite RI/PCI/CQI reports as the two flows are not directly multiplexed but are transmitted at different times

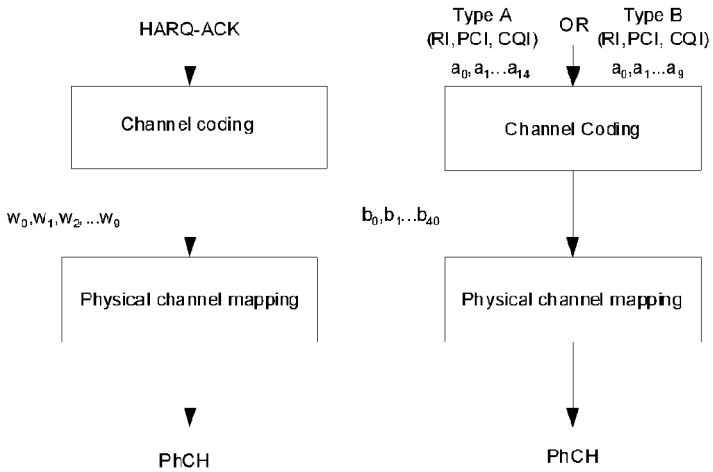

Figure 20A.1: Coding for each HS-DPCCH when the UE is configured in MIMO mode with four transmit antennas

4.7.2 Channel coding for HS-DPCCH when the UE is not configured in MIMO mode in the serving HS-DSCH cell and Secondary_Cell_Enabled is 0 or 1 and Secondary_Cell_Active is 0

Two forms of channel coding are used, one for the channel quality indication (CQI) and another for HARQ-ACK (acknowledgement).

*4.7.2.1 Channel coding for HS-DPCCH HARQ-ACK*

The HARQ acknowledgement message to be transmitted, as defined in [4], shall be coded to 10 bits as shown in Table 15. The output is denoted $w_0, w_1, \ldots w_9$.

Table 15: Channel coding of HARQ-ACK when the UE is not configured in MIMO mode in the serving HS-DSCH cell and Secondary_Cell_Enabled is 0 or 1 and Secondary_Cell_Active is 0

| HARQ-ACK message to be transmitted | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|
| | | | | | | | | | | |

| ACK  | 1 | 1 | 1 | 1 | 1 | 1 | 1 | 1 | 1 | 1 |
|------|---|---|---|---|---|---|---|---|---|---|
| NACK | 0 | 0 | 0 | 0 | 0 | 0 | 0 | 0 | 0 | 0 |
| PRE  | 0 | 0 | 1 | 0 | 0 | 1 | 0 | 0 | 1 | 0 |
| POST | 0 | 1 | 0 | 0 | 1 | 0 | 0 | 1 | 0 | 0 |

*4.7.2.2 Channel coding for HS-DPCCH channel quality indication*

The channel quality indication is coded using a (20,5) code. The code words of the (20,5) code are a linear combination of the 5 basis sequences denoted $M_{i,n}$ defined in the table below.

Table 15A: Basis sequences for (20,5) code

| i  | $M_{i,0}$ | $M_{i,1}$ | $M_{i,2}$ | $M_{i,3}$ | $M_{i,4}$ |
|----|-----------|-----------|-----------|-----------|-----------|
| 0  | 1 | 0 | 0 | 0 | 1 |
| 1  | 0 | 1 | 0 | 0 | 1 |
| 2  | 1 | 1 | 0 | 0 | 1 |
| 3  | 0 | 0 | 1 | 0 | 1 |
| 4  | 1 | 0 | 1 | 0 | 1 |
| 5  | 0 | 1 | 1 | 0 | 1 |
| 6  | 1 | 1 | 1 | 0 | 1 |
| 7  | 0 | 0 | 0 | 1 | 1 |
| 8  | 1 | 0 | 0 | 1 | 1 |
| 9  | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 |

The CQI values 0 ... 30 as defined in [4] are converted from decimal to binary to map them to the channel quality indication bits (1 0 0 0 0) to (1 1 1 1 1) respectively. The information bit pattern (0 0 0 0 0) shall not be used in this release. The channel quality indication bits are $a_0$, $a_1$, $a_2$, $a_3$, $a_4$ (where $a_0$ is LSB and $a_4$ is MSB). The output code word bits $b_i$ are given by:

$$b_i = \sum_{n=0}^{4}(a_n \times M_{i,n}) \bmod 2$$

where $i = 0, ..., 19$.

4.7.3 Channel coding for HS-DPCCH when the UE is configured in MIMO mode in the serving HS-DSCH cell and Secondary_Cell_Enabled is 0

Two forms of channel coding are used, one for the composite precoding control indication (PCI) and channel quality indication (CQI) and another for HARQ-ACK (acknowledgement).

*4.7.3.1 Channel coding for HS-DPCCH HARQ-ACK*

The HARQ acknowledgement message to be transmitted, as defined in [4], shall be coded to 10 bits as shown in Table 15B. The output is denoted $w_0, w_1, ... w_9$.

Table 15B: Channel coding of HARQ-ACK when the UE is configured in MIMO mode in the serving HS-DSCH cell and Secondary_Cell_Enabled is 0

| HARQ-ACK message to be transmitted | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| HARQ-ACK in response to a single scheduled transport block | | | | | | | | | | | |
| ACK | | 1 | 1 | 1 | 1 | 1 | 1 | 1 | 1 | 1 | 1 |
| NACK | | 0 | 0 | 0 | 0 | 0 | 0 | 0 | 0 | 0 | 0 |
| HARQ-ACK in response to two scheduled transport blocks | | | | | | | | | | | |
| Response to primary transport block | Response to secondary transport block | | | | | | | | | | |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |
| PRE/POST indication | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

*4.7.3.2 Channel coding for HS-DPCCH composite precoding control indication and channel quality indication*

When the UE is configured in MIMO mode and single-stream restriction is not configured, two types of CQI reports shall be supported by the UE. According to the definition of the CQI reporting procedure in [4], type A CQI reports use values 0 ... 255 and type B CQI reports use values 0 ... 30, respectively. When the UE is configured in MIMO mode and single-stream restriction is configured, only type B shall be supported by the UE.

*4.7.3.2.1    Bit mapping of Type A channel quality indication*

In case a type A CQI shall be reported, the CQI values 0 ... 255 as defined in [4] are converted from decimal to binary to map them to the channel quality indication bits (0 0 0 0 0 0 0 0) to (1 1 1 1 1 1 1 1), respectively. The channel quality indication bits are $cqi_0$, $cqi_1$, $cqi_2$, $cqi_3$, $cqi_4$, $cqi_5$, $cqi_6$, $cqi_7$ (where $cqi_0$ is LSB and $cqi_7$ is MSB).

*4.7.3.2.2    Bit mapping of Type B channel quality indication*

In case a type B CQI shall be reported, the CQI values 0 ... 30 as defined in [4] are converted from decimal to binary to map them to the channel quality indication bits (1 0 0 0 0) to (1 1 1 1 1), respectively. The information bit pattern (0 0 0 0 0) shall not be used in this release. The channel quality indication bits are $cqi_0$, $cqi_1$, $cqi_2$, $cqi_3$, $cqi_4$ (where $cqi_0$ is LSB and $cqi_4$ is MSB).

*4.7.3.2.3    Bit mapping of precoding control indication*

According to the PCI definition in [4], the range of possible PCI values is 0 ... 3. The PCI values 0 ... 3 as defined in [4] are converted from decimal to binary to map them to the precoding control indication bits (0 0) to (1 1) respectively. The precoding control indication bits are $pci_0$, $pci_1$ (where $pci_0$ is LSB and $pci_1$ is MSB).

*4.7.3.2.4    Composite precoding control indication and channel quality indication bits*

Two formats for composite PCI/CQI information words are possible depending on the type of the reported CQI value. The two formats shall be constructed according to the scheme depicted in Figure 20B.

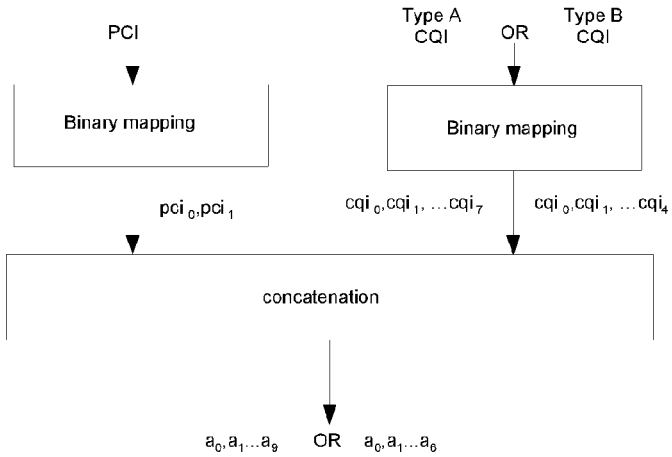

• Figure 20B: Construction of composite PCI/CQI report

In case a type A CQI shall be reported, the precoding control indication bits $pci_0$, $pci_1$, and the channel quality indication bits $cqi_0$, $cqi_1$, $cqi_2$, $cqi_3$, $cqi_4$, $cqi_5$, $cqi_6$, $cqi_7$ are concatenated to the composite precoding control indication and channel quality indication bits according to the relation $$(a_0\ a_1\ a_2\ a_3\ a_4\ a_5\ a_6\ a_7\ a_8\ a_9) = (pci_0\ pci_1\ cqi_0\ cqi_1\ cqi_2\ cqi_3\ cqi_4\ cqi_5\ cqi_6\ cqi_7)$$

In case a type B CQI shall be reported, the precoding control indication bits $pci_0$, $pci_1$, and the channel quality indication bits $cqi_0$, $cqi_1$, $cqi_2$, $cqi_3$, $cqi_4$ are concatenated to the composite precoding control indication and channel quality indication bits according to the relation $$(a_0\ a_1\ a_2\ a_3\ a_4\ a_5\ a_6) = (pci_0\ pci_1\ cqi_0\ cqi_1\ cqi_2\ cqi_3\ cqi_4)$$

*4.7.3.2.5 Block encoding of composite precoding control indication and channel quality indication bits*

In case a type A CQI needs to be reported, the composite precoding control indication and channel quality indication is coded using a (20,10) code. The code words of the (20,10) code are a linear combination of the 10 basis sequences denoted $M_{i,n}$ defined in the table 15C below.

Table 15C: Basis sequences for channel encoding of composite PCI/CQI reports

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 |
| 2 | 0 | 0 | 0 | 1 | 0 | 0 | 0 | 0 | 0 | 0 | 0 |
| 3 | 0 | 0 | 0 | 0 | 1 | 0 | 0 | 0 | 0 | 0 | 0 |
| 4 | 0 | 0 | 0 | 0 | 0 | 1 | 0 | 0 | 0 | 0 | 0 |
| 5 | 0 | 0 | 0 | 0 | 0 | 0 | 0 | 1 | 0 | 0 | 0 |
| 6 | 0 | 0 | 0 | 0 | 0 | 0 | 0 | 0 | 1 | 0 | 1 |
| 7 | 0 | 0 | 0 | 0 | 0 | 0 | 0 | 0 | 0 | 1 | 1 |
| 8 | 1 | 0 | 1 | 0 | 0 | 0 | 1 | 1 | 1 | 0 | 1 |
| 9 | 1 | 1 | 0 | 1 | 0 | 0 | 0 | 1 | 1 | 1 | 1 |
| 10 | 0 | 1 | 1 | 0 | 1 | 0 | 0 | 0 | 1 | 1 | 1 |
| 11 | 1 | 0 | 1 | 1 | 0 | 1 | 0 | 0 | 0 | 1 | 0 |
| 12 | 1 | 1 | 0 | 1 | 1 | 0 | 1 | 0 | 0 | 0 | 0 |
| 13 | 1 | 1 | 1 | 0 | 1 | 1 | 0 | 1 | 0 | 0 | 0 |
| 14 | 0 | 1 | 1 | 1 | 0 | 1 | 1 | 0 | 1 | 0 | 1 |
| 15 | 0 | 0 | 1 | 1 | 1 | 0 | 1 | 1 | 0 | 1 | 0 |
| 16 | 0 | 0 | 0 | 1 | 1 | 1 | 0 | 1 | 1 | 0 | 1 |
| 17 | 1 | 0 | 0 | 0 | 1 | 1 | 1 | 0 | 1 | 1 | 1 |
| 18 | 0 | 1 | 0 | 0 | 0 | 1 | 1 | 1 | 0 | 1 | 0 |
| 19 | 1 | 1 | 1 | 1 | 1 | 1 | 1 | 1 | 1 | 1 | 1 |

The output code word bits $b_i$ are given by:

$$b_i = \sum_{n=0}^{9} (a_n \times M_{i,n}) \bmod 2$$

where $i = 0, \ldots, 19$.

In case a type B CQI needs to be reported, the composite precoding control indication and channel quality indication is coded using a (20,7) code. The code words of the (20,7) code are a linear combination of the basis sequences denoted $M_{i,n}$ defined in the table 15C for $n \in \{0,1,3,4,5,7,10\}$.

The output code word bits $b_i$ are given by:

$$b_i = \left( \sum_{n=0}^{1} (a_n \times M_{i,n}) + \sum_{n=2}^{4} (a_n \times M_{i,n+1}) + a_5 \times M_{i,7} + a_6 \times M_{i,10} \right) \bmod 2$$

where $i = 0, \ldots, 19$.

4.7.3A Channel coding for HS-DPCCH when the UE is not configured in MIMO mode in any cell and Secondary_Cell_Enabled is 1 and Secondary_Cell_Active is 1

Two forms of channel coding are used, one for the composite channel quality indication (CQI) and another for the composite HARQ-ACK (acknowledgement).

*4.7.3A.1    Channel coding for the composite HS-DPCCH HARQ-ACK*

The composite HARQ acknowledgement message to be transmitted, as defined in [4], shall be coded to 10 bits as shown in Table 15C.1. The output is denoted $w_0, w_1, \ldots w_9$.

Table 15C.1: Channel coding of HARQ-ACK when the UE is not configured in MIMO mode in a pair of serving HS-DSCH cells and Secondary_Cell_Enabled is 1 and Secondary_Cell_Active is 1

| HARQ-ACK message to be transmitted | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| HARQ-ACK when UE detects a single scheduled transport block on the serving HS-DSCH cell | | | | | | | | | | | |
| ACK | | 1 | 1 | 1 | 1 | 1 | 1 | 1 | 1 | 1 | 1 |
| NACK | | 0 | 0 | 0 | 0 | 0 | 0 | 0 | 0 | 0 | 0 |
| HARQ-ACK when UE detects a single scheduled transport block on the secondary serving HS-DSCH cell | | | | | | | | | | | |
| ACK | | 1 | 1 | 1 | 1 | 1 | 0 | 0 | 0 | 0 | 0 |
| NACK | | 0 | 0 | 0 | 0 | 0 | 1 | 1 | 1 | 1 | 1 |
| HARQ-ACK when UE detects a single scheduled transport block on each of the serving and secondary serving HS-DSCH cells | | | | | | | | | | | |
| Response to transport block from serving HS-DSCH cell | Response to transport block from secondary serving HS-DSCH cell | | | | | | | | | | |
| ACK | ACK | 1 | 0 | 1 | 0 | 1 | 0 | 1 | 0 | 1 | 0 |
| ACK | NACK | 1 | 1 | 0 | 0 | 1 | 1 | 0 | 0 | 1 | 1 |
| NACK | ACK | 0 | 0 | 1 | 1 | 0 | 0 | 1 | 1 | 0 | 0 |
| NACK | NACK | 0 | 1 | 0 | 1 | 0 | 1 | 0 | 1 | 0 | 1 |
| PRE/POST indication | | | | | | | | | | | |

| PRE | | 0 | 0 | 1 | 0 | 0 | 1 | 0 | 0 | 1 | 0 |
|---|---|---|---|---|---|---|---|---|---|---|---|
| POST | | 0 | 1 | 0 | 0 | 1 | 0 | 0 | 1 | 0 | 0 |

*4.7.3A.2     Channel coding for HS-DPCCH composite channel quality indication*

*4.7.3A.2.1     Composite channel quality indication bits*

The composite CQI report is constructed from two individual CQI reports that are represented by CQI1 and CQI2. CQI1 corresponds to the serving HS-DSCH cell and CQI2 corresponds to the secondary serving HS-DSCH cell.

Each constituent CQI report uses values 0 ... 30 in accordance with the definition of the CQI reporting procedure in [4]. The individual CQI values are converted from decimal to binary to map them to the channel quality indication bits (1 0 0 0 0) to (1 1 1 1 1) respectively. The information bit pattern (0 0 0 0 0) shall not be used in this release. The channel quality indication bits corresponding to CQI1 are $cqi1_0$, $cqi1_1$, $cqi1_2$, $cqi1_3$, $cqi1_4$ (where $cqi1_0$ is LSB and $cqi1_4$ is MSB) and those corresponding to CQI2 are $cqi2_0$, $cqi2_1$, $cqi2_2$, $cqi2_3$, $cqi2_4$ (where $cqi2_0$ is LSB and $cqi2_4$ is MSB).

The composite CQI report is constructed according to the scheme depicted in Figure 20C

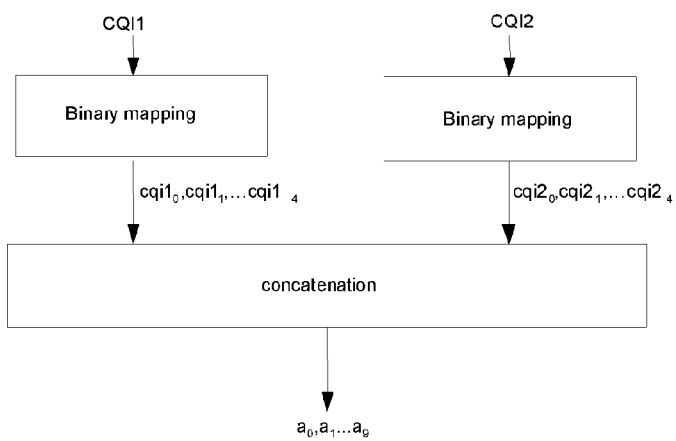

Figure 20C: Construction of composite CQI report

The two individual CQI reports are concatenated to form the composite channel quality indication according to the relation $$(a_0\ a_1\ a_2\ a_3\ a_4\ a_5\ a_6\ a_7\ a_8\ a_9) = (cqi1_0\ cqi1_1\ cqi1_2\ cqi1_3\ cqi1_4\ cqi2_0\ cqi2_1\ cqi2_2\ cqi2_3\ cqi2_4)$$

*4.7.3A.2.2     Block encoding of composite channel quality indication bits*

The composite channel quality indication is coded using a (20,10) code. The code words of the (20,10) code are a linear combination of the 10 basis sequences denoted $M_{i,n}$ defined in Table 15C.

The output code word bits $b_i$ are given by:

$$b_i = \sum_{n=0}^{9}(a_n \times M_{i,n}) \bmod 2$$

where $i = 0, \ldots, 19$ and $a_0, \ldots, a_9$ are defined in the previous subclause.

4.7.3B Channel coding for HS-DPCCH when Secondary_Cell_Enabled is at least 3 or when the UE is configured in MIMO mode in at least one cell and Secondary_Cell_Enabled is greater than 0

Two forms of channel coding are used, one for the composite precoding control indication (PCI) and channel quality indication (CQI) and another for the composite HARQ-ACK (acknowledgement).

*4.7.3B.1    Channel coding for the composite HS-DPCCH HARQ-ACK*

The composite HARQ acknowledgement message to be transmitted, as defined in [4], shall be coded to 10 bits as shown in Table 15C.2. The feedback related to the first cell is given before the divider sign and the feedback related to the second cell is given after the divider sign. 'A' means 'ACK', 'N' means 'NACK' and 'D' means 'no transmission' ('DTX'). 'AA', 'AN', 'NA' and 'NN' refer to feedback for dual-stream transmission in a cell. For example, 'AN' means ACK on the primary stream and NACK on the secondary stream. The output is denoted $w_0, w_1, \ldots w_9$.

When Secondary_Cell_Enabled is 2, and when Secondary_Cell_Active is 2, HARQ-ACK information for the $2^{nd}$ secondary serving HS-DSCH cell is jointly encoded with a DTX message in place of the $3^{rd}$ secondary serving HS-DSCH cell.

When Secondary_Cell_Enabled is 4, and when Secondary_Cell_Active is 4, HARQ-ACK information for the $4^{th}$ secondary serving HS-DSCH cell is jointly encoded with a DTX message in place of the $5^{th}$ secondary serving HS-DSCH cell.

When Secondary_Cell_Enabled is 6, and when Secondary_Cell_Active is 6, HARQ-ACK information for the $6^{th}$ secondary serving HS-DSCH cell is jointly encoded with a DTX message in place of the $7^{th}$ secondary serving HS-DSCH cell.

Table 15C.2: Channel coding of HARQ-ACK when Secondary_Cell_Enabled is at least 3 or the UE is configured in MIMO mode in at least one cell and Secondary_Cell_Enabled is greater than 0

| HARQ-ACK | $w_0$ | $w_1$ | $w_2$ | $w_3$ | $w_4$ | $w_5$ | $w_6$ | $w_7$ | $w_8$ | $w_9$ | HARQ-ACK | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|---|---|---|---|---|---|---|---|---|---|

| message to be transmitted | | | | | | | | | | message to be transmitted | | | | | | | | | |
|---|---|---|---|---|---|---|---|---|---|---|---|---|---|---|---|---|---|---|---|
| A/D | 1 | 1 | 1 | 1 | 1 | 1 | 1 | 1 | 1 | AA/A | 0 | 1 | 1 | 0 | 0 | 0 | 1 | 0 | 0 |
| N/D | 0 | 0 | 0 | 0 | 0 | 0 | 0 | 0 | 0 | AA/N | 1 | 1 | 1 | 0 | 0 | 1 | 1 | 0 | 1 | 0 |
| AA/D | 1 | 0 | 1 | 0 | 1 | 1 | 1 | 1 | 0 | 1 | AN/A | 1 | 0 | 1 | 1 | 1 | 0 | 0 | 1 | 1 | 0 |
| AN/D | 1 | 1 | 0 | 1 | 0 | 1 | 0 | 1 | 1 | AN/N | 0 | 0 | 1 | 1 | 0 | 1 | 0 | 0 | 0 | 1 |
| NA/D | 0 | 1 | 1 | 1 | 0 | 1 | 0 | 1 | 1 | NA/A | 0 | 1 | 0 | 1 | 1 | 1 | 1 | 0 | 0 |
| NN/D | 1 | 0 | 0 | 1 | 0 | 0 | 1 | 0 | 0 | 0 | NA/N | 1 | 1 | 0 | 0 | 1 | 0 | 0 | 0 | 0 | 1 |
| D/A | 0 | 0 | 0 | 0 | 0 | 1 | 1 | 1 | 1 | NN/A | 0 | 0 | 0 | 1 | 1 | 0 | 0 | 1 | 0 |
| D/N | 1 | 1 | 1 | 1 | 1 | 0 | 0 | 0 | 0 | NN/N | 0 | 1 | 0 | 0 | 1 | 1 | 0 | 0 | 1 |
| D/AA | 1 | 0 | 0 | 0 | 1 | 0 | 0 | 0 | 1 | 1 | AA/AA | 0 | 1 | 1 | 0 | 1 | 1 | 0 | 1 | 1 | 1 |
| D/AN | 0 | 1 | 0 | 0 | 0 | 0 | 1 | 1 | 0 | 1 | AA/AN | 1 | 0 | 1 | 1 | 0 | 0 | 1 | 1 | 1 | 1 |
| D/NA | 0 | 0 | 0 | 1 | 1 | 1 | 1 | 1 | 1 | 0 | AA/NA | 1 | 1 | 0 | 1 | 1 | 1 | 0 | 0 | 0 | 1 |
| D/NN | 1 | 1 | 1 | 1 | 1 | 0 | 0 | 1 | 0 | 0 | AA/NN | 0 | 1 | 1 | 1 | 0 | 1 | 1 | 1 | 0 | 0 |
| A/A | 1 | 1 | 0 | 1 | 0 | 0 | 0 | 0 | 1 | 1 | AN/AA | 0 | 0 | 0 | 1 | 1 | 0 | 0 | 1 | 0 | 1 |
| A/N | 0 | 0 | 1 | 1 | 1 | 0 | 1 | 0 | 0 | 1 | AN/AN | 1 | 1 | 1 | 0 | 0 | 0 | 0 | 0 | 0 | 1 |
| N/A | 1 | 0 | 1 | 0 | 1 | 1 | 1 | 0 | 0 | AN/NA | 1 | 0 | 0 | 0 | 0 | 1 | 0 | 1 | 0 | 0 |
| N/N | 0 | 1 | 1 | 0 | 0 | 1 | 0 | 1 | 0 | 1 | AN/NN | 0 | 0 | 1 | 1 | 0 | 1 | 0 | 0 | 0 | 1 |
| A/AA | 1 | 0 | 1 | 0 | 0 | 1 | 1 | 0 | 0 | 0 | NA/AA | 1 | 1 | 0 | 0 | 1 | 0 | 1 | 1 | 1 | 0 |
| A/AN | 1 | 0 | 0 | 1 | 0 | 1 | 0 | 1 | 0 | 1 | NA/AN | 0 | 0 | 1 | 0 | 1 | 0 | 1 | 0 | 0 | 0 |
| A/NA | 0 | 0 | 1 | 1 | 1 | 0 | 1 | 0 | 0 | 1 | NA/NA | 1 | 0 | 1 | 1 | 1 | 1 | 0 | 0 | 1 | 0 |
| A/NN | 0 | 1 | 1 | 1 | 0 | 1 | 0 | 0 | 1 | 1 | NA/NN | 1 | 1 | 1 | 0 | 0 | 1 | 1 | 0 | 1 | 0 |
| N/AA | 1 | 1 | 0 | 1 | 0 | 0 | 1 | 0 | 1 | 0 | NN/AA | 0 | 1 | 0 | 1 | 0 | 0 | 0 | 0 | 1 | 0 |
| N/AN | 1 | 1 | 0 | 0 | 0 | 1 | 0 | 1 | 1 | 0 | NN/AN | 0 | 0 | 1 | 0 | 0 | 0 | 0 | 1 | 1 | 0 |
| N/NA | 0 | 1 | 1 | 0 | 1 | 0 | 1 | 0 | 1 | 0 | NN/NA | 0 | 1 | 0 | 0 | 1 | 1 | 0 | 0 | 0 | 0 |
| N/NN | 0 | 0 | 1 | 0 | 1 | 1 | 0 | 1 | 0 | 1 | NN/NN | 0 | 0 | 0 | 0 | 0 | 1 | 1 | 0 | 1 | 1 |
| PRE/POST | | | | | | | | | | | | | | | | | | | | |
| PRE | 0 | 0 | 1 | 0 | 0 | 1 | 0 | 0 | 1 | 0 | POST | 0 | 1 | 0 | 0 | 1 | 0 | 0 | 1 | 0 | 0 |

When Secondary_Cell_Active is 2 or 3, and when DTX message is indicated for a cell pair, whose HARQ-ACK information is jointly encoded, the specific DTX code word as defined in Table 15C.2A is transmitted for that cell pair except for the case when DTX message is indicated for all active cells, in which case the HARQ-ACK slot is DTXed. The slot containing HARQ-ACK information is either transmitted or DTXed. If Secondary_Cell_Active is larger than 3 and when DTX message is indicated for both cell pairs transmitted on one of the two HS-DPCCHs and there is at least one HARQ-ACK message associated with the other HS-DPCCH that does not correspond to DTX message, then the specific DTX code word as defined in Table 15C.2A is transmitted for all cell pairs for which a DTX message is indicated. If the DTX message is indicated for all active cell pairs then the slot on each respective HS-DPCCH containing the HARQ-ACK information is DTXed.

Table 15C.2A: Channel coding of HARQ-ACK for a pair of DTX messages when Secondary_Cell_Active is greater than 2

| HARQ-ACK message to be transmitted | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|
| D/D | 0 | 0 | 1 | 1 | 0 | 1 | 1 | 0 | 1 | 0 |

*4.7.3B.2    Channel coding for HS-DPCCH composite precoding control indication and channel quality indication*

The channel coding for CQI associated with a cell for which the UE is not configured in MIMO mode is specified in subclause 4.7.2.2.

The channel coding for PCI and CQI associated with a cell for which the UE is configured in MIMO mode is specified in subclause 4.7.3.2.

4.7.3C Channel coding for HS-DPCCH when the UE is not configured in MIMO mode in any cell and Secondary_Cell_Enabled is 2

Two forms of channel coding are used, one for the composite channel quality indication (CQI) and another for the composite HARQ-ACK (acknowledgement).

*4.7.3C.1    Channel coding for the composite HS-DPCCH HARQ-ACK*

Table 15C.3: Channel coding of HARQ-ACK when the UE is not configured in MIMO mode in any cell and Secondary_Cell_Enabled is 2

| HARQ-ACK message to be transmitted | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|
| A/D/D | 1 | 1 | 1 | 1 | 1 | 1 | 1 | 1 | 1 | 1 |
| N/D/D | 0 | 0 | 0 | 0 | 0 | 0 | 0 | 0 | 0 | 0 |

| | | | | | | | | | | |
|---|---|---|---|---|---|---|---|---|---|---|
| D/A/D | 1 | 1 | 1 | 1 | 1 | 0 | 0 | 0 | 0 | 0 |
| D/N/D | 0 | 0 | 0 | 0 | 0 | 1 | 1 | 1 | 1 | 1 |
| D/D/A | 1 | 1 | 0 | 0 | 0 | 1 | 1 | 0 | 0 | 0 |
| D/D/N | 0 | 0 | 1 | 1 | 1 | 0 | 0 | 1 | 1 | 1 |
| A/A/D | 1 | 0 | 1 | 0 | 1 | 0 | 1 | 0 | 1 | 0 |
| A/N/D | 1 | 1 | 0 | 0 | 1 | 1 | 0 | 0 | 1 | 1 |
| N/A/D | 0 | 0 | 1 | 1 | 0 | 0 | 1 | 1 | 0 | 0 |
| N/N/D | 0 | 1 | 0 | 1 | 0 | 1 | 0 | 1 | 0 | 1 |
| A/D/A | 1 | 0 | 1 | 1 | 0 | 1 | 1 | 0 | 0 | 1 |
| A/D/N | 0 | 1 | 0 | 1 | 1 | 0 | 1 | 0 | 0 | 1 |
| N/D/A | 0 | 0 | 0 | 1 | 1 | 1 | 0 | 1 | 1 | 0 |
| N/D/N | 1 | 0 | 0 | 1 | 1 | 1 | 0 | 1 | 0 | 0 |
| D/A/A | 0 | 1 | 1 | 1 | 0 | 1 | 0 | 0 | 1 | 0 |
| D/A/N | 1 | 0 | 1 | 0 | 0 | 1 | 0 | 1 | 1 | 0 |
| D/N/A | 0 | 1 | 1 | 0 | 0 | 0 | 1 | 0 | 1 | 1 |
| D/N/N | 0 | 0 | 0 | 0 | 1 | 0 | 1 | 0 | 1 | 1 |
| A/A/A | 1 | 1 | 0 | 1 | 0 | 0 | 1 | 1 | 1 | 0 |
| A/A/N | 0 | 1 | 1 | 0 | 1 | 1 | 1 | 1 | 0 | 0 |
| A/N/A | 1 | 0 | 0 | 1 | 0 | 0 | 0 | 0 | 1 | 1 |
| A/N/N | 0 | 0 | 1 | 0 | 1 | 1 | 0 | 0 | 0 | 1 |
| N/A/A | 1 | 1 | 1 | 0 | 0 | 0 | 0 | 1 | 0 | 1 |
| N/A/N | 0 | 1 | 0 | 0 | 1 | 0 | 0 | 1 | 1 | 0 |
| N/N/A | 1 | 0 | 0 | 0 | 1 | 0 | 1 | 1 | 0 | 1 |
| N/N/N | 1 | 1 | 1 | 1 | 0 | 1 | 0 | 1 | 0 | 0 |
| PRE/POST | | | | | | | | | | |
| PRE | 0 0 1 0 0 1 0 0 1 0 | | | | | POST | 0 1 0 0 1 0 0 1 0 0 | | | |

*4.7.3C.2    Channel coding for HS-DPCCH channel quality indication*

The channel coding for CQI is specified in subclause 4.7.2.2 for the serving HS-DSCH cell, and in subclause 4.7.3A.2 for the 1$^{st}$ and 2$^{nd}$ secondary serving HS-DSCH cells.

4.7.3D Channel coding for HS-DPCCH when the UE is configured in MIMO mode in the serving HS-DSCH cell and Secondary_Cell_Enabled is 0

Two forms of channel coding are used, one for the composite number of transport blocks preferred (RI), precoding control indication (PCI) and channel quality indication (CQI) and another for HARQ-ACK (acknowledgement).

*4.7.3D.1    Channel coding for HS-DPCCH HARQ-ACK*

The HARQ acknowledgement message to be transmitted, as defined in [4], shall be coded to 10 bits as shown in Table 15B.1. The output is denoted $w_0, w_1, ... w_9$.

Table 15B.1: Channel coding of HARQ-ACK when the UE is configured in MIMO mode in the serving HS-DSCH cell and Secondary_Cell_Enabled is 0

| HARQ-ACK message to be transmitted | | | $W_0$ | $w_1$ | $W_2$ | $w_3$ | $w_4$ | $w_5$ | $w_6$ | $w_7$ | $w_8$ | $w_9$ |
|---|---|---|---|---|---|---|---|---|---|---|---|---|
| HARQ-ACK in response to a single scheduled transport block | | | | | | | | | | | | |
| ACK | | | 1 | 1 | 1 | 1 | 1 | 1 | 1 | 1 | 1 | 1 |
| NACK | | | 0 | 0 | 0 | 0 | 0 | 0 | 0 | 0 | 0 | 0 |
| HARQ-ACK in response to two scheduled transport blocks | | | | | | | | | | | | |
| Response to primary transport block | Response to secondary transport block | | | | | | | | | | | |
| ACK | ACK | | 1 | 0 | 1 | 0 | 1 | 1 | 1 | 1 | 0 | 1 |
| ACK | NACK | | 1 | 1 | 0 | 1 | 0 | 1 | 0 | 1 | 1 | 1 |
| NACK | ACK | | 0 | 1 | 1 | 1 | 1 | 0 | 1 | 0 | 1 | 1 |
| NACK | NACK | | 1 | 0 | 0 | 1 | 0 | 0 | 1 | 0 | 0 | 0 |
| HARQ-ACK in response to three scheduled transport blocks | | | | | | | | | | | | |
| Response to primary transport block | Response to secondary transport block | Response to third transport block | | | | | | | | | | |
| ACK | ACK | ACK | 1 | 0 | 1 | 0 | 1 | 1 | 1 | 1 | 0 | 1 |
| ACK | NACK | ACK | 1 | 1 | 0 | 1 | 0 | 1 | 0 | 1 | 1 | 1 |

| NACK | ACK | ACK | 0 | 1 | 1 | 1 | 1 | 0 | 1 | 0 | 1 | 1 |
| NACK | NACK | ACK | 1 | 0 | 0 | 1 | 0 | 0 | 1 | 0 | 0 | 0 |
| ACK | ACK | NACK | 1 | 1 | 0 | 1 | 0 | 1 | 0 | 1 | 1 | 1 |
| ACK | NACK | NACK | 1 | 1 | 0 | 1 | 0 | 1 | 0 | 1 | 1 | 1 |
| NACK | ACK | NACK | 1 | 0 | 0 | 1 | 0 | 0 | 1 | 0 | 0 | 0 |
| NACK | NACK | NACK | 1 | 0 | 0 | 1 | 0 | 0 | 1 | 0 | 0 | 0 |

HARQ-ACK in response to four scheduled transport blocks

| Response to primary transport block | Response to secondary transport block | Response to third transport block | Response to fourth transport block | | | | | | | | | |
|---|---|---|---|---|---|---|---|---|---|---|---|---|
| ACK | ACK | ACK | ACK | 1 | 0 | 1 | 0 | 1 | 1 | 1 | 1 | 0 | 1 |
| ACK | NACK | ACK | ACK | 1 | 1 | 0 | 1 | 0 | 1 | 0 | 1 | 1 | 1 |
| NACK | ACK | ACK | ACK | 0 | 1 | 1 | 1 | 1 | 0 | 1 | 0 | 1 | 1 |
| NACK | NACK | ACK | ACK | 1 | 0 | 0 | 1 | 0 | 0 | 1 | 0 | 0 | 0 |
| ACK | ACK | NACK | ACK | 1 | 1 | 0 | 1 | 0 | 1 | 0 | 1 | 1 | 1 |
| ACK | NACK | NACK | ACK | 1 | 1 | 0 | 1 | 0 | 1 | 0 | 1 | 1 | 1 |
| NACK | ACK | NACK | ACK | 1 | 0 | 0 | 1 | 0 | 0 | 1 | 0 | 0 | 0 |
| NACK | NACK | NACK | ACK | 1 | 0 | 0 | 1 | 0 | 0 | 1 | 0 | 0 | 0 |
| ACK | ACK | ACK | NACK | 0 | 1 | 1 | 1 | 1 | 0 | 1 | 0 | 1 | 1 |
| ACK | NACK | ACK | NACK | 1 | 0 | 0 | 1 | 0 | 0 | 1 | 0 | 0 | 0 |
| NACK | ACK | ACK | NACK | 0 | 1 | 1 | 1 | 1 | 0 | 1 | 0 | 1 | 1 |
| NACK | NACK | ACK | NACK | 1 | 0 | 0 | 1 | 0 | 0 | 1 | 0 | 0 | 0 |
| ACK | ACK | NACK | NACK | 1 | 0 | 0 | 1 | 0 | 0 | 1 | 0 | 0 | 0 |
| ACK | NACK | NACK | NACK | 1 | 0 | 0 | 1 | 0 | 0 | 1 | 0 | 0 | 0 |
| NACK | ACK | NACK | NACK | 1 | 0 | 0 | 1 | 0 | 0 | 1 | 0 | 0 | 0 |
| NACK | NACK | NACK | | 1 | 0 | 0 | 1 | 0 | 0 | 1 | 0 | 0 | 0 |

|  |  |  | NACK |  |  |  |  |  |  |  |  |
|---|---|---|---|---|---|---|---|---|---|---|---|
| PRE/POST indication | | | | | | | | | | | |
| PRE | | | 0 | 0 | 1 | 0 | 0 | 1 | 0 | 0 | 1 | 0 |
| POST | | | 0 | 1 | 0 | 0 | 1 | 0 | 0 | 1 | 0 | 0 |

*4.7.3D.2    Channel coding for HS-DPCCH composite number of transport blocks preferred, precoding control indication and channel quality indication*

When the UE is configured in MIMO mode with four transmit antennas two types of CQI reports shall be supported by the UE. According to the definition of the CQI reporting procedure in [4], type A CQI reports use values 0 ... 255 and type B CQI reports use values 0 ... 30, respectively.

*4.7.3D.2.1    Bit mapping of Type A channel quality indication*

In case a type A CQI shall be reported, the CQI values 0 ... 255 as defined in [4] are converted from decimal to binary to map them to the channel quality indication bits (0 0 0 0 0 0 0 0) to (1 1 1 1 1 1 1 1), respectively. The channel quality indication bits are $cqi_0$, $cqi_1$, $cqi_2$, $cqi_3$, $cqi_4$, $cqi_5$, $cqi_6$, $cqi_7$ (where $cqi_0$ is LSB and $cqi_7$ is MSB).

*4.7.3D.2.2    Bit mapping of Type B channel quality indication*

In case a type B CQI shall be reported, the CQI values 0 ... 30 as defined in [4] are converted from decimal to binary to map them to the channel quality indication bits (1 0 0 0 0) to (1 1 1 1 1), respectively. The information bit pattern (0 0 0 0 0) shall not be used in this release. The channel quality indication bits are $cqi_0$, $cqi_1$, $cqi_2$, $cqi_3$, $cqi_4$ (where $cqi_0$ is LSB and $cqi_4$ is MSB).

*4.7.3D.2.4    Bit mapping of number of transport blocks preferred*

According to the RI definition in [4], the range of possible RI values is 0 ... 3. The RI values 0 ... 3 as defined in [4] are converted from decimal to binary to map them to the number of transport blocks preferred bits (0 0) to (1 1) respectively. The number of transport blocks preferred bits are $ri_0, ri_1$ (where $ri_0$ is LSB and $ri_1$ is MSB).

*4.7.3D.2.5    Bit mapping of precoding control indication*

According to the PCI definition in [4], the range of possible PCI values is 0 ... 15. The PCI values 0 ... 15 as defined in [4] are converted from decimal to binary to map them to the precoding control indication bits (0 0,0,0) to (1 1,1,1) respectively. The precoding control indication bits are $pci_0$, $pci_1$, $pci_2$, $pci_3$ (where $pci_0$ is LSB and $pci_3$ is MSB).

*4.7.3D.2.5    Composite number of transport blocks preferred, precoding control indication and channel quality indication bits*

Two formats for composite RI/PCI/CQI information words are possible depending on the type of the reported CQI value. The two formats shall be constructed according to the scheme depicted in Figure 20B.1.

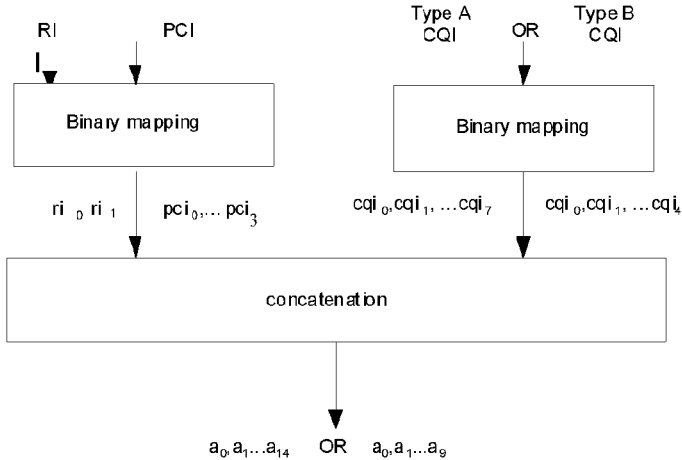

- Figure 20B.1: Construction of composite RI/PCI/CQI report

In case a type A CQI shall be reported, the number of transport blocks preferred bits $ri_0$, $ri_1$, precoding control indication bits $pci_0$, $pci_1$, $pci_2$, $pci_3$, and the channel quality indication bits $cqi_0$, $cqi_1$, $cqi_2$, $cqi_3$, $cqi_4$, $cqi_5$, $cqi_6$, $cqi_7$ are concatenated to the composite precoding control indication and channel quality indication bits according to the relation $$(a_0\ a_1\ a_2\ a_3\ a_4\ a_5\ a_6\ a_7\ a_8\ a_9\ a_{10}\ a_{11}\ a_{12}\ a_{13}\ a_{14}) =$$
$$(ri_0 ri_1 pci_0\ pci_1\ pci_2 pci_3 cqi_0\ cqi_1\ cqi_2\ cqi_3\ cqi_4\ cqi_5\ cqi_6\ cqi_7)$$

In case a type B CQI shall be reported, the precoding control indication bits $pci_0$, $pci_1$, $pci_2$, $pci_3$, and the channel quality indication bits $cqi_0$, $cqi_1$, $cqi_2$, $cqi_3$, $cqi_4$ are concatenated to the composite precoding control indication and channel quality indication bits according to the relation $$(a_0\ a_1\ a_2\ a_3\ a_4\ a_5\ a_6 a_7\ a_8\ a_9) = (pci_0\ pci_1\ pci_2 pci_3 cqi_0\ cqi_1\ cqi_2\ cqi_3\ cqi_4)$$

*4.7.3D.2.6 Channel encoding of number of transport blocks preferred, composite precoding control indication and channel quality indication bits*

In case a type A CQI needs to be reported, the composite number of transport blocks preferred, precoding control indication and channel quality indication is coded using Rate 1/2 convolutional coding, as described in Section 4.2.3.1 This gives a sequence of bits $b_1$, $b_2$ ..., $b_{44}$.

Note that the coded sequence lengths result from the termination of K=9 convolutional coding being fully applied.

From the input sequence $z_{1,1}, z_{1,2}, \ldots, z_{1,48}$ the bits $z_{1,1}, z_{1,2}, z_{1,4}, z_{1,8}, z_{142}, z_{1,45}, z_{1,47}, z_{1,48}$ are punctured to obtain the output sequence $r_{1,1}, r_{1,2} \ldots r_{1,40}$.

The invention claimed is:

1. A method at a User Equipment, UE, that is configured for operation in a Multiple Input Multiple Output, MIMO, mode with four transmit antennas, in a multi-antenna wireless communications system, said method comprising:
receiving a MIMO transmission from the multi-antenna wireless communications system said MIMO transmission comprising a number of transport blocks; and
providing bundled Hybrid Automatic Repeat reQuest Acknowledgment/Negative-Acknowledgment, HARQ-ACK/NACK, feedback information for the MIMO transmission by, when the MIMO transmission comprises three or four transport blocks, sending a single HARQ-ACK/NACK for second and third ones of the three or four transport blocks that positively acknowledges the second and third transport blocks only if both the second and third transport blocks are correctly received and otherwise negatively acknowledges the second and third transport blocks.

2. The method of claim 1, wherein providing the bundled HARQ-ACK/NACK feedback information for the MIMO transmission comprises encoding HARQ-ACK/NACKs for the three or four transport blocks according to an existing MIMO codebook defined for MIMO transmissions comprising two transport blocks, such that the single HARQ-ACK/NACK sent for the second and third transport blocks is encoded as being the HARQ-ACK/NACK for one of the two transport blocks accounted for in the existing MIMO codebook, and such that a single HARQ-ACK/NACK for a first one, or for first and fourth ones, of the three or four transport blocks, is encoded as being the HARQ-ACK/NACK for the other one of the two transport blocks accounted for in the existing MIMO codebook.

3. The method of claim 2, wherein the existing MIMO codebook is the MIMO codebook defined for 1-2 transmit antennas according to the Release 7 MIMO standard for High Speed Downlink Packet Access, HSDPA.

4. The method of claim 1, wherein providing the bundled HARQ-ACK/NACK feedback information for the MIMO transmission further comprises, when the MIMO transmission comprises four transport blocks, sending a single HARQ-ACK/NACK for first and fourth ones of the four transport blocks that positively acknowledges the first and fourth transport blocks only if both the first and fourth transport blocks are correctly received and otherwise negatively acknowledges the first and fourth transport blocks.

5. The method of claim 4, wherein providing the bundled HARQ-ACK/NACK feedback information for the MIMO transmission comprises encoding the HARQ-ACK/NACKs for the four transport blocks according to an existing MIMO codebook defined for MIMO transmissions comprising two transport blocks, such that the single HARQ-ACK/NACK for the second and third transport blocks is encoded as being the HARQ-ACK/NACK for one of the two transport blocks accounted for in the existing MIMO codebook and the single HARQ-ACK/NACK for the first and fourth transport blocks is encoded as being the HARQ-ACK/NACK for the other one of the two transport blocks accounted for in the existing MIMO codebook.

6. The method of claim 5, wherein the existing MIMO codebook is the MIMO codebook defined for 1-2 transmit antennas according to the Release 7 MIMO standard for High Speed Downlink Packet Access, HSDPA.

7. The method of claim 1, wherein providing the bundled HARQ-ACK/NACK feedback information for the MIMO transmission comprises transmitting the bundled HARQ-ACK/NACK feedback information to the multi-antenna wireless communications system, as an uplink transmission on a High Speed Dedicated Physical Control Channel, HS-DPCCH.

8. The method of claim 1, wherein providing the bundled HARQ-ACK/NACK feedback information for the MIMO transmission comprises encoding a HARQ acknowledgement message to 10 bits, denoted $w_0, w_1, \ldots w_9$, as shown in the following table:

| HARQ-ACK message to be transmitted | | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|---|
| HARQ-ACK in response to a single scheduled transport block | | | | | | | | | | | | |
| ACK | | | 1 | 1 | 1 | 1 | 1 | 1 | 1 | 1 | 1 | 1 |
| NACK | | | 0 | 0 | 0 | 0 | 0 | 0 | 0 | 0 | 0 | 0 |
| HARQ-ACK in response to two scheduled transport blocks | | | | | | | | | | | | |
| Response to primary transport block | Response to secondary transport block | | | | | | | | | | | |
| ACK | ACK | | 1 | 0 | 1 | 0 | 1 | 1 | 1 | 1 | 0 | 1 |
| ACK | NACK | | 1 | 1 | 0 | 1 | 0 | 1 | 0 | 1 | 1 | 1 |
| NACK | ACK | | 0 | 1 | 1 | 1 | 1 | 0 | 1 | 0 | 1 | 1 |
| NACK | NACK | | 1 | 0 | 0 | 1 | 0 | 0 | 1 | 0 | 0 | 0 |
| HARQ-ACK in response to three scheduled transport blocks | | | | | | | | | | | | |
| Response to primary transport block | Response to secondary transport block | Response to third transport block | | | | | | | | | | |
| ACK | ACK | ACK | 1 | 0 | 1 | 0 | 1 | 1 | 1 | 1 | 0 | 1 |
| ACK | NACK | ACK | 1 | 1 | 0 | 1 | 0 | 1 | 0 | 1 | 1 | 1 |
| NACK | ACK | ACK | 0 | 1 | 1 | 1 | 1 | 0 | 1 | 0 | 1 | 1 |
| NACK | NACK | ACK | 1 | 0 | 0 | 1 | 0 | 0 | 1 | 0 | 0 | 0 |
| ACK | ACK | NACK | 1 | 1 | 0 | 1 | 0 | 1 | 0 | 1 | 1 | 1 |
| ACK | NACK | NACK | 1 | 1 | 0 | 1 | 0 | 1 | 0 | 1 | 1 | 1 |

-continued

| HARQ-ACK message to be transmitted | | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|---|
| NACK | ACK | NACK | 1 | 0 | 0 | 1 | 0 | 0 | 1 | 0 | 0 | 0 |
| NACK | NACK | NACK | 1 | 0 | 0 | 1 | 0 | 0 | 1 | 0 | 0 | 0 |

| HARQ-ACK in response to four scheduled transport blocks | | | | | | | | | | | | | |
|---|---|---|---|---|---|---|---|---|---|---|---|---|---|
| Response to primary transport block | Response to secondary transport block | Response to third transport block | Response to fourth transport block | | | | | | | | | | |
| ACK | ACK | ACK | ACK | 1 | 0 | 1 | 0 | 1 | 1 | 1 | 1 | 0 | 1 |
| ACK | NACK | ACK | ACK | 1 | 1 | 0 | 1 | 0 | 1 | 0 | 1 | 1 | 1 |
| NACK | ACK | ACK | ACK | 0 | 1 | 1 | 1 | 1 | 0 | 1 | 0 | 1 | 1 |
| NACK | NACK | ACK | ACK | 1 | 0 | 0 | 1 | 0 | 0 | 1 | 0 | 0 | 0 |
| ACK | ACK | NACK | ACK | 1 | 1 | 0 | 1 | 0 | 1 | 0 | 1 | 1 | 1 |
| ACK | NACK | NACK | ACK | 1 | 1 | 0 | 1 | 0 | 1 | 0 | 1 | 1 | 1 |
| NACK | ACK | NACK | ACK | 1 | 0 | 0 | 1 | 0 | 0 | 1 | 0 | 0 | 0 |
| NACK | NACK | NACK | ACK | 1 | 0 | 0 | 1 | 0 | 0 | 1 | 0 | 0 | 0 |
| ACK | ACK | ACK | NACK | 0 | 1 | 1 | 1 | 1 | 0 | 1 | 0 | 1 | 1 |
| ACK | NACK | ACK | NACK | 1 | 0 | 0 | 1 | 0 | 0 | 1 | 0 | 0 | 0 |
| NACK | ACK | ACK | NACK | 0 | 1 | 1 | 1 | 1 | 0 | 1 | 0 | 1 | 1 |
| NACK | NACK | ACK | NACK | 1 | 0 | 0 | 1 | 0 | 0 | 1 | 0 | 0 | 0 |
| ACK | ACK | NACK | NACK | 1 | 0 | 0 | 1 | 0 | 0 | 1 | 0 | 0 | 0 |
| ACK | NACK | NACK | NACK | 1 | 0 | 0 | 1 | 0 | 0 | 1 | 0 | 0 | 0 |
| NACK | ACK | NACK | NACK | 1 | 0 | 0 | 1 | 0 | 0 | 1 | 0 | 0 | 0 |
| NACK | NACK | NACK | NACK | 1 | 0 | 0 | 1 | 0 | 0 | 1 | 0 | 0 | 0 |

| PRE/POST indication | | | | | | | | | | | | | |
|---|---|---|---|---|---|---|---|---|---|---|---|---|---|
| | | | PRE | 0 | 0 | 1 | 0 | 0 | 1 | 0 | 0 | 1 | 0 |
| | | | POST | 0 | 1 | 0 | 0 | 1 | 0 | 0 | 1 | 0 | 0. |

9. A User Equipment, UE, configured for operation in a Multiple Input Multiple Output, MIMO, mode with four transmit antennas, in a multi-antenna wireless communications system, said UE comprising:
a receiver configured to receive a MIMO transmission from the multi-antenna wireless communications system, said MIMO transmission comprising a number of transport blocks; and
processing circuitry configured to provide bundled Hybrid Automatic Repeat reQuest Acknowledgment/Negative-Acknowledgment, HARQ-ACK/NACK, feedback information for the MIMO transmission by, when the MIMO transmission comprises three or four transport blocks, sending, via an associated transmitter, a single HARQ-ACK/NACK for second and third ones of the three or four transport blocks that positively acknowledges the second and third transport blocks only if both the second and third transport blocks are correctly received and otherwise negatively acknowledges the second and third transport blocks.

10. The UE of claim 9, wherein the processing circuitry is configured to provide the bundled HARQ-ACK/NACK feedback information for the MIMO transmission based on encoding HARQ-ACK/NACKs for the three or four transport blocks according to an existing MIMO codebook defined for MIMO transmissions comprising two transport blocks, such that the single HARQ-ACK/NACK for the second and third transport blocks is encoded as being the HARQ-ACK/NACK for one of the two transport blocks accounted for in the existing MIMO codebook, and such that a single HARQ-ACK/NACK for a first one, or for first and fourth ones, of the three or four transport blocks is encoded as being the HARQ-ACK/NACK for the other one of the two transport blocks accounted for in the existing MIMO codebook.

11. The UE of claim 10, wherein the existing MIMO codebook is the MIMO codebook defined for 1-2 transmit antennas according to the Release 7 MIMO standard for High Speed Downlink Packet Access, HSDPA.

12. The UE of claim 9, wherein the processing circuitry is configured to provide the bundled HARQ-ACK/NACK feedback information for the MIMO transmission by, when the MIMO transmission comprises four transport blocks, sending a single HARQ-ACK/NACK for first and fourth ones of the four transport blocks that positively acknowledges the first and fourth transport blocks only if both the first and fourth transport blocks are correctly received and otherwise negatively acknowledges the first and fourth transport blocks.

13. The UE of claim 12, wherein the processing circuitry is configured to provide the bundled HARQ-ACK/NACK feedback information for the MIMO transmission by encoding the HARQ-ACK/NACKs for the four transport blocks according to an existing MIMO codebook defined for MIMO transmissions comprising two transport blocks, such that the single HARQ-ACK/NACK for the second and third transport blocks is encoded as being the HARQ-ACK/NACK for one of the two transport blocks accounted for in the existing MIMO codebook and the single HARQ-ACK/NACK for the first and fourth transport blocks is encoded as being the HARQ-ACK/NACK for the other one of the two transport blocks accounted for the existing MIMO codebook.

14. The UE of claim 13, wherein the existing MIMO codebook is the MIMO codebook defined for 1-2 transmit antennas according to the Release 7 MIMO standard for High Speed Downlink Packet Access, HSDPA.

15. The UE of claim 9, wherein the processing circuitry is configured to provide the bundled HARQ-ACK/NACK feedback information for the MIMO transmission based on transmitting the bundled HARQ-ACK/NACK feedback information to the multi-antenna wireless communications system, as an uplink transmission on a High Speed Dedicated Physical Control Channel, HS-DPCCH.

16. The UE of claim 9, wherein the processing circuitry is configured to provide the bundled HARQ-ACK/NACK feedback information for the MIMO transmission by encoding a HARQ acknowledgement message to 10 bits, denoted $w_0$, $w_1, \ldots w_9$, as shown in the following table:

| HARQ-ACK message to be transmitted | | | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|---|---|
| HARQ-ACK in response to a single scheduled transport block | | | | | | | | | | | | | |
| ACK | | | | 1 | 1 | 1 | 1 | 1 | 1 | 1 | 1 | 1 | 1 |
| NACK | | | | 0 | 0 | 0 | 0 | 0 | 0 | 0 | 0 | 0 | 0 |
| HARQ-ACK in response to two scheduled transport blocks | | | | | | | | | | | | | |
| Response to primary transport block | Response to secondary transport block | | | | | | | | | | | | |
| ACK | ACK | | | 1 | 0 | 1 | 0 | 1 | 1 | 1 | 1 | 0 | 1 |
| ACK | NACK | | | 1 | 1 | 0 | 1 | 0 | 1 | 0 | 1 | 1 | 1 |
| NACK | ACK | | | 0 | 1 | 1 | 1 | 1 | 0 | 1 | 0 | 1 | 1 |
| NACK | NACK | | | 1 | 0 | 0 | 1 | 0 | 0 | 1 | 0 | 0 | 0 |
| HARQ-ACK in response to three scheduled transport blocks | | | | | | | | | | | | | |
| Response to primary transport block | Response to secondary transport block | Response to third transport block | | | | | | | | | | | |
| ACK | ACK | ACK | | 1 | 0 | 1 | 0 | 1 | 1 | 1 | 1 | 0 | 1 |
| ACK | NACK | ACK | | 1 | 1 | 0 | 1 | 0 | 1 | 0 | 1 | 1 | 1 |
| NACK | ACK | ACK | | 0 | 1 | 1 | 1 | 1 | 0 | 1 | 0 | 1 | 1 |
| NACK | NACK | ACK | | 1 | 0 | 0 | 1 | 0 | 0 | 1 | 0 | 0 | 0 |
| ACK | ACK | NACK | | 1 | 1 | 0 | 1 | 0 | 1 | 0 | 1 | 1 | 1 |
| ACK | NACK | NACK | | 1 | 1 | 0 | 1 | 0 | 1 | 0 | 1 | 1 | 1 |
| NACK | ACK | NACK | | 1 | 0 | 0 | 1 | 0 | 0 | 1 | 0 | 0 | 0 |
| NACK | NACK | NACK | | 1 | 0 | 0 | 1 | 0 | 0 | 1 | 0 | 0 | 0 |
| HARQ-ACK in response to four scheduled transport blocks | | | | | | | | | | | | | |
| Response to primary transport block | Response to secondary transport block | Response to third transport block | Response to fourth transport block | | | | | | | | | | |
| ACK | ACK | ACK | ACK | 1 | 0 | 1 | 0 | 1 | 1 | 1 | 1 | 0 | 1 |
| ACK | NACK | ACK | ACK | 1 | 1 | 0 | 1 | 0 | 1 | 0 | 1 | 1 | 1 |
| NACK | ACK | ACK | ACK | 0 | 1 | 1 | 1 | 1 | 0 | 1 | 0 | 1 | 1 |
| NACK | NACK | ACK | ACK | 1 | 0 | 0 | 1 | 0 | 0 | 1 | 0 | 0 | 0 |
| ACK | ACK | NACK | ACK | 1 | 1 | 0 | 1 | 0 | 1 | 0 | 1 | 1 | 1 |
| ACK | NACK | NACK | ACK | 1 | 1 | 0 | 1 | 0 | 1 | 0 | 1 | 1 | 1 |
| NACK | ACK | NACK | ACK | 1 | 0 | 0 | 1 | 0 | 0 | 1 | 0 | 0 | 0 |
| NACK | NACK | NACK | ACK | 1 | 0 | 0 | 1 | 0 | 0 | 1 | 0 | 0 | 0 |
| ACK | ACK | ACK | NACK | 0 | 1 | 1 | 1 | 1 | 0 | 1 | 0 | 1 | 1 |
| ACK | NACK | ACK | NACK | 1 | 0 | 0 | 1 | 0 | 0 | 1 | 0 | 0 | 0 |
| NACK | ACK | ACK | NACK | 0 | 1 | 1 | 1 | 1 | 0 | 1 | 0 | 1 | 1 |
| NACK | NACK | ACK | NACK | 1 | 0 | 0 | 1 | 0 | 0 | 1 | 0 | 0 | 0 |
| ACK | ACK | NACK | NACK | 1 | 0 | 0 | 1 | 0 | 0 | 1 | 0 | 0 | 0 |
| ACK | NACK | NACK | NACK | 1 | 0 | 0 | 1 | 0 | 0 | 1 | 0 | 0 | 0 |
| NACK | ACK | NACK | NACK | 1 | 0 | 0 | 1 | 0 | 0 | 1 | 0 | 0 | 0 |
| NACK | NACK | NACK | NACK | 1 | 0 | 0 | 1 | 0 | 0 | 1 | 0 | 0 | 0 |
| PRE/POST indication | | | | | | | | | | | | | |
| PRE | | | | 0 | 0 | 1 | 0 | 0 | 1 | 0 | 0 | 1 | 0 |
| POST | | | | 0 | 1 | 0 | 0 | 1 | 0 | 0 | 1 | 0 | 0. |

17. A method performed by a network node in a multi-antenna wireless communications system, said method comprising:
receiving bundled Hybrid Automatic Repeat reQuest Acknowledgment/Non-Acknowledgment, HARQ-ACK/NACK, feedback information from a User Equipment, UE, operating in the multi-antenna wireless communications system in a Multiple Input Multiple Output, MIMO, mode with four transmit antennas, said bundled HARQ-ACK/NACK feedback information comprising two or more HARQ-ACK/NACKs sent by the UE responsive to receiving a MIMO transmission from the multi-antenna wireless communications system that comprises a number of transport blocks; and
when the MIMO transmission comprises three or four transport blocks, interpreting one of the HARQ-ACK/NACKs included in the HARQ-ACK/NACK feedback information as co-representing the HARQ-ACK/NACK for a second one of the three or four transport blocks and the HARQ-ACK/NACK for a third one of the three or four transport blocks.

18. The method of claim 17, wherein, when the MIMO transmission comprises three transport blocks, the HARQ-ACK/NACK feedback information comprises first and second HARQ-ACK/NACKs, and the method comprises interpreting one of the first and second HARQ-ACK/NACKs as co-representing the HARQ-ACK/NACK for the second one of the three transport blocks and the HARQ-ACK/NACK for the third one of the three transport blocks, and interpreting the other one of the first and second HARQ-ACK/NACKs as representing the HARQ-ACK/NACK for a first one of the three transport blocks.

19. The method of claim 17, wherein, when the MIMO transmission comprises four transport blocks, the HARQ-ACK/NACK feedback information comprises first and second HARQ-ACK/NACKs, and the method comprises interpreting one of the first and second HARQ-ACK/NACKs as co-representing the HARQ-ACK/NACKs for the second and third ones of the four transport blocks, and interpreting the other one of the first and second HARQ-ACK/NACKs as co-representing the HARQ-ACK/NACK for a first one of the four transport blocks and the HARQ-ACK/NACK for a fourth one of the four transport blocks.

20. A network node configured for operation in a multi-antenna wireless communications system, said network node comprising:
a receiver configured to receive bundled Hybrid Automatic Repeat reQuest Acknowledgment/Non-Acknowledgment, HARQ-ACK/NACK, feedback information from a User Equipment, UE, operating in the multi-antenna wireless communications system in a Multiple Input Multiple Output, MIMO, mode with four transmit antennas, said bundled HARQ-ACK/NACK feedback information comprising two or more HARQ-ACK/NACKs sent by the UE responsive to receiving a MIMO transmission from said multi-antenna wireless communications system that comprises a number of transport blocks; and
processing circuitry that is configured to, when the MIMO transmission comprises three or four transport blocks, interpret one of the HARQ-ACK/NACKs included in the HARQ-ACK/NACK feedback information as co-representing the HARQ-ACK/NACK for a second one of the three or four transport blocks and the HARQ-ACK/NACK for a third one of the three or four transport blocks.

21. The network node of claim 20, wherein, when the MIMO transmission comprises three transport blocks, the HARQ-ACK/NACK feedback information comprises first and second HARQ-ACK/NACKs, and wherein the processing circuitry is configured to interpret one of the first and second HARQ-ACK/NACKs as co-representing the HARQ-ACK/NACKs for the second and third ones of the three transport blocks, and to interpret the other one of the first and second HARQ-ACK/NACKs as representing the HARQ-ACK/NACK for a first one of the three transport blocks.

22. The network node of claim 20, wherein, when the MIMO transmission comprises four transport blocks, the HARQ-ACK/NACK feedback information comprises first and second HARQ-ACK/NACKs, and wherein the processing circuitry is configured to interpret one of the first and second HARQ-ACK/NACKs as co-representing the HARQ-ACK/NACKs for the second and third ones of the four transport blocks, and interpret the other one of the first and second HARQ-ACK/NACKs as co-representing the HARQ-ACK/NACK for a first one of the four transport blocks and the HARQ-ACK/NACK for a fourth one of the four transport blocks.

23. A non-transitory computer readable medium storing a computer program comprising computer program instructions that, when executed by processing circuitry of a User Equipment, UE, configured for operation in a Multiple Input Multiple Output, MIMO, mode with four transmit antennas, in a multi-antenna wireless communications system, configures the UE to provide bundled Hybrid Automatic Repeat reQuest Acknowledgment/Negative-Acknowledgment, HARQ-ACK/NACK, feedback information for a MIMO transmission received by the UE, including program instructions to configure the UE to, when the MIMO transmission comprises three or four transport blocks, send a single HARQ-ACK/NACK for second and third ones of the three or four transport blocks that positively acknowledges the second and third transport blocks only if both the second and third transport blocks are correctly received and otherwise negatively acknowledges the second and third transport blocks.

* * * * *